United States Patent
Kim et al.

(10) Patent No.: US 10,384,646 B2
(45) Date of Patent: Aug. 20, 2019

(54) SMART KEY FOR VEHICLE AND SYSTEM

(71) Applicant: LG Electronics Inc., Seoul (KR)

(72) Inventors: Janghwan Kim, Seoul (KR); Sunbin Kang, Seoul (KR); Leesak Kim, Seoul (KR); Sewon Park, Seoul (KR); Youngsok Lee, Seoul (KR); Hyeoncheol Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/857,698

(22) Filed: Dec. 29, 2017

(65) Prior Publication Data

US 2018/0319370 A1    Nov. 8, 2018

(30) Foreign Application Priority Data

May 2, 2017  (KR) .......................... 10-2017-0056419

(51) Int. Cl.
  *B60R 25/24*  (2013.01)
  *B60R 25/25*  (2013.01)

(52) U.S. Cl.
  CPC .............. *B60R 25/24* (2013.01); *B60R 25/25* (2013.01); *B60R 25/252* (2013.01); *B60R 2325/205* (2013.01); *B60R 2325/40* (2013.01)

(58) Field of Classification Search
  CPC ....... B60R 25/24; B60R 25/252; B60R 25/25; B60R 2325/40; B60R 2325/205
  See application file for complete search history.

(56) References Cited

U.S. PATENT DOCUMENTS

| | | | |
|---|---|---|---|
| 6,850,153 B1* | 2/2005 | Murakami | .......... B60L 11/1816 235/384 |
| 2004/0073440 A1* | 4/2004 | Garbers | ................ G06Q 10/02 705/5 |

(Continued)

FOREIGN PATENT DOCUMENTS

| EP | 3086296 | 10/2016 |
|---|---|---|
| EP | 3187377 | 7/2017 |

(Continued)

OTHER PUBLICATIONS

Computer English translation of JP2009-030312; Inventor: Sago Tetsuya; Title:"Keyless system capable of selecting a plurality of vehicles with one portable unit"; Feb. 2, 2009; pp. 1-34. (Year: 2009).*

(Continued)

*Primary Examiner* — Brian E Miller
(74) *Attorney, Agent, or Firm* — Fish & Richardson P.C.

(57) ABSTRACT

A smart key configured to control a plurality of vehicles includes: a first communication unit configured to exchange information with the plurality of vehicles; an information acquisition device configured to acquire user information associated with a user of the smart key; at least one processor; and a computer-readable medium coupled to the at least one processor having stored thereon instructions which, when executed by the at least one processor, causes the at least one processor to perform operations including: based on the user information, selecting, as a vehicle to enter, at least one vehicle among the plurality of vehicles based on the user information and based on information associated with the plurality of vehicles; and exchanging, through the first communication unit, a signal with the selected at least one vehicle.

20 Claims, 19 Drawing Sheets

(56) References Cited

U.S. PATENT DOCUMENTS

| | | | |
|---|---|---|---|
| 2006/0259207 A1* | 11/2006 | Natsume | G06F 8/65 701/1 |
| 2009/0278656 A1 | 11/2009 | Lopez et al. | |
| 2014/0129051 A1* | 5/2014 | Gautama | B60R 25/245 701/2 |
| 2014/0266594 A1* | 9/2014 | Reiser | B60R 25/24 340/5.72 |
| 2015/0145648 A1* | 5/2015 | Winkelman | G07C 9/00309 340/5.72 |
| 2015/0248799 A1* | 9/2015 | Lee | G07C 9/00174 340/5.53 |
| 2016/0203661 A1* | 7/2016 | Pudar | B60R 25/24 340/5.25 |
| 2016/0306350 A1* | 10/2016 | Shim | G05D 1/0016 |
| 2017/0182976 A1* | 6/2017 | Chen | H04M 1/72522 |
| 2018/0103022 A1* | 4/2018 | Tokunaga | B60R 25/24 |
| 2018/0170308 A1* | 6/2018 | Kim | B60R 25/00 |
| 2018/0265039 A1* | 9/2018 | Jain | B60R 25/24 |
| 2018/0268629 A1* | 9/2018 | Jain | G07C 9/00111 |
| 2018/0319370 A1* | 11/2018 | Kim | B60R 25/252 |
| 2018/0326947 A1* | 11/2018 | Oesterling | B60R 25/241 |

FOREIGN PATENT DOCUMENTS

| | | |
|---|---|---|
| JP | 2004227513 | 8/2004 |
| JP | 2009030312 | 2/2009 |
| JP | 2011-154535 | 8/2011 |
| KR | 1020120134359 | 12/2012 |
| KR | 1020140079186 | 6/2014 |
| KR | 1020150132991 | 11/2015 |
| KR | 101718072 | 3/2017 |
| KR | 10-1841501 | 5/2018 |

OTHER PUBLICATIONS

European Search Report in European Application No. 18170071.7, dated Sep. 25, 2018, 8 pages.

\* cited by examiner

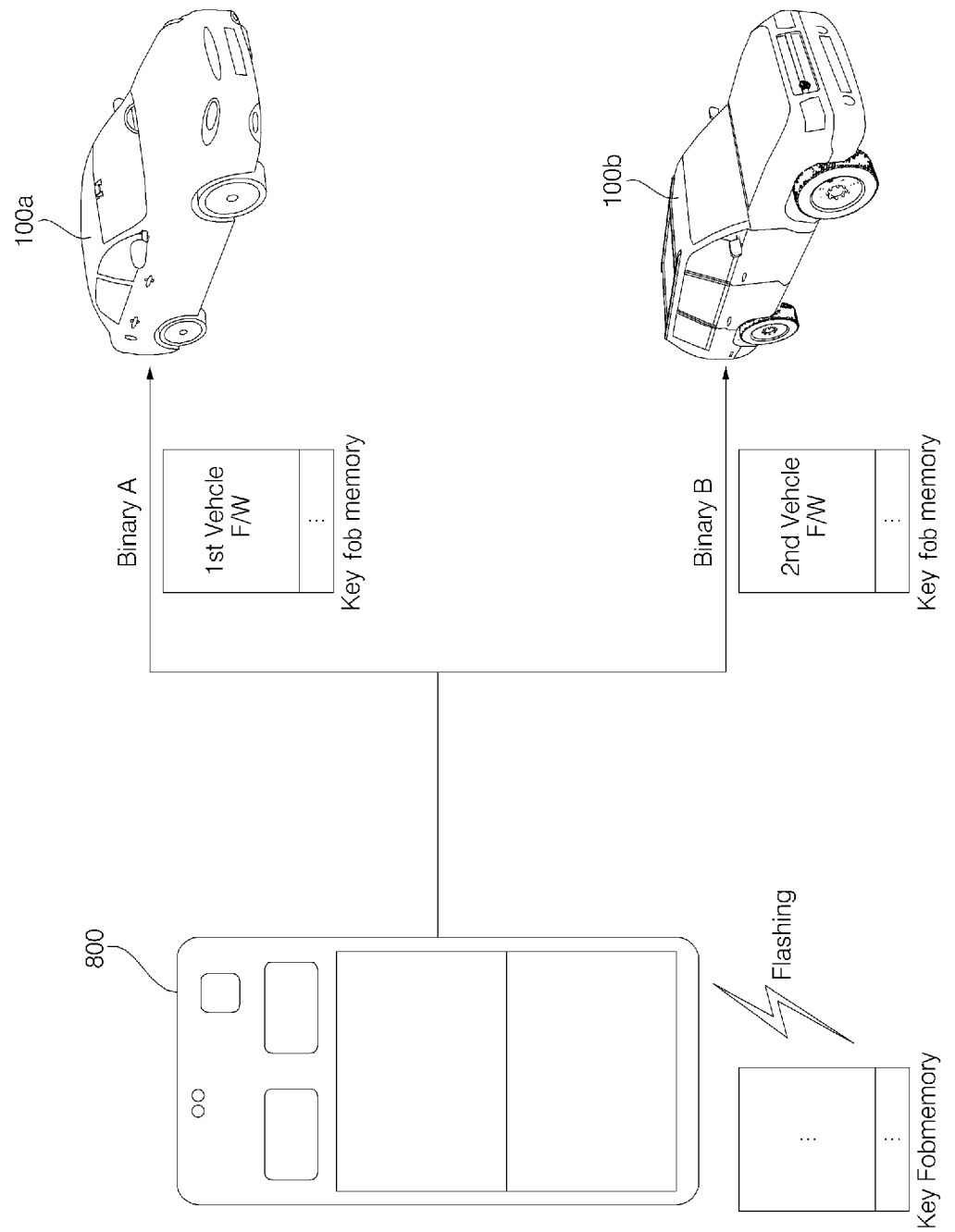

SMART KEY FOR VEHICLE AND SYSTEM

CROSS-REFERENCE TO RELATED APPLICATION

This application claims the priority benefit of Korean Patent Application No. 10-2017-0056419, filed on May 2, 2017 in the Korean Intellectual Property Office, the disclosure of which is incorporated herein by reference in its entirety.

TECHNICAL FIELD

The present disclosure relates to a smart key for vehicles.

BACKGROUND

A vehicle is an apparatus configured to move a user in the user's desired direction. A representative example of a vehicle may be an automobile.

A smart key may be provided for a vehicle to provide user with access to a vehicle. The smart key may provide various additional functionalities over conventional keys to enhance convenience of the user.

SUMMARY

In one aspect, a smart key configured to control a plurality of vehicles includes: a first communication unit configured to exchange information with the plurality of vehicles; an information acquisition device configured to acquire user information associated with a user of the smart key; at least one processor; and a computer-readable medium coupled to the at least one processor having stored thereon instructions which, when executed by the at least one processor, causes the at least one processor to perform operations including: based on the user information, selecting, as a vehicle to enter, at least one vehicle among the plurality of vehicles based on the user information and based on information associated with the plurality of vehicles; and exchanging, through the first communication unit, a signal with the selected at least one vehicle.

Implementations may include one or more of the following features. For example, the information acquisition device includes at least one of: an input unit configured to receive a user input; a sensor configured to sense biometric information of the user; or a second communication unit configured to wirelessly receive the user information from an external device.

In some implementations, the user information includes at least one of authentication information associated with the user, destination information associated with the user, preferred vehicle information associated with the user, driving record information associated with the user, physical information associated with the user, or location information associated with the user.

In some implementations, the information associated with the plurality of vehicles includes at least one of, for each of the plurality of the vehicles, location information, energy reserve information, mileage information, fuel economy information, function information, or vehicle type information.

In some implementations, the smart key further includes an output unit, and the operations include: outputting, through the output unit, information associated with the selected at least one vehicle.

In some implementations, the operations include: outputting, through the output unit, route information associated with a walking route between a location of the user and a location of the selected at least one vehicle.

In some implementations, the operations include: based on the user information, determining a level of control authority associated with the user in controlling the selected at least one vehicle; and transmitting, through the first communication unit, the determined level of control authority to the selected at least one vehicle.

In some implementations, determining the level of control authority includes determining at least one of a maximum driving speed, a maximum driving distance, a maximum distance from a reference location, a maximum driving time, permitted timeslot, or a permitted road.

In some implementations, the smart key further includes a memory, the information acquisition device is further configured to acquire first key fob data associated with another vehicle, and the operations include: acquiring, through the information acquisition device, the first key fob data associated with the other vehicle; and storing, in the memory, the first key fob data of the other vehicle.

In some implementations, the first key fob data is stored as a portion of a firmware of the smart key.

In some implementations, storing the first key fob data includes: overwriting a second key fob data associated with one of the plurality of vehicles with the first key fob data by flashing the memory.

In some implementations, a plurality of key fob data associated with the plurality of vehicles and the other vehicle are stored in different regions of the firmware, the different regions each being dedicated for each of the plurality of vehicles.

In some implementations, the smart key further includes a second communication unit configured to exchange data with a mobile terminal, and the operations include: transmitting, through the second communication unit, third key fob data associated with the selected at least one vehicle to the mobile terminal.

In some implementations, the operations include: acquiring, through the second communication unit, a first location associated with the mobile terminal and a second location associated with the selected at least one vehicle; determining that a distance between the first location and the second location is less than or equal to a reference distance; and based on the determination that the distance between the first location and the second location is less than or equal to the reference distance, transmitting the key fob data to the mobile terminal.

In some implementations, the operations include: based on the user information, determining a level of control authority associated with the user in controlling the selected at least one vehicle; and transmitting, through the second communication unit, the determined level of control authority to the mobile terminal.

In some implementations, the operations include: determining that the mobile terminal is located inside of the selected at least one vehicle; and based on the determination that the mobile terminal is located inside of the selected at least one vehicle, receiving, through the second communication unit, driving situation information associated with the selected at least one vehicle.

In some implementations, the plurality of vehicles includes a first vehicle and a second vehicle, and the operations include: simultaneously transmitting, through the first communication unit, a first signal configured to control the first vehicle and a second signal configured to control the second vehicle.

In some implementations, the second signal is configured to control the second vehicle to follow the first vehicle.

In some implementations, the operations include: determining that a distance to the selected at least one vehicle is less than or equal to a reference distance; and based on the determination that the distance to the selected at least one vehicle is less than or equal to the reference distance, transmitting, through the first communication unit, a control signal to the selected at least one vehicle.

In some implementations, the operations include: transmitting, through the first communication unit, a control signal to the selected at least one vehicle configured to set one or more vehicle settings based on the user information.

In another aspect, a smart key configured to control a plurality of vehicles includes: a first communication unit configured to exchange information with the plurality of vehicles; a memory configured to store key fob data of each of the plurality of vehicles; an input unit configured to receive a user input; at least one processor; and a computer-readable medium coupled to the at least one processor having stored thereon instructions which, when executed by the at least one processor, causes the at least one processor to perform operations including: selecting, as a vehicle to enter, at least one vehicle among the plurality of vehicles based on the user input; retrieving, from the memory, at least one first key fob data corresponding to the selected at least one vehicle; and transmitting, through the first communication unit, a control signal based on the retrieved first key fob data to the selected at least one vehicle.

In another aspect, a system includes: the smart key configured to control a plurality of vehicles; and the plurality of vehicles.

In some scenarios, according to some implementations of the present disclosure, one or more of the following effects may be achieved.

First, a plurality of vehicles may be controlled with a single smart key.

Second, user convenience may be improved by selecting a vehicle suitable for a user based on user information and vehicle information.

Third, key fob data of additional vehicles may be stored on the smart key to enable access to additional vehicles.

Fourth, a control authority of a vehicle may be set based on the user of the vehicle, which may improve driving safety.

Fifth, functions of the smart key may be implemented by a mobile terminal, allowing user control of a vehicle with the mobile terminal without physical possession of the smart key.

Effects of the present disclosure should not be limited to the aforementioned effects and other unmentioned effects will be clearly understood by those skilled in the art from the claims. The details of one or more implementations are set forth in the accompanying drawings and the description below. Other features will be apparent from the description and drawings, and from the claims. The description and specific examples below are given by way of illustration only, and various changes and modifications will be apparent.

BRIEF DESCRIPTION OF THE DRAWINGS

FIGS. 14A and 14B are diagrams illustrating an example operation of a smart key according to an implementation.

DETAILED DESCRIPTION

Implementations are disclosed herein that enable smart keys that communicate with and control one or more vehicles. Such smart keys may be configured to perform various types of control operations, including simpler control operations such as wirelessly opening a door of a vehicle or turning on an ignition system of the vehicle. A smart key may be configured to control only one vehicle, or may be configured to control multiple vehicles.

In order to improve user convenience, implementations are disclosed herein that enable a smart key with improved and diverse functionalities.

A vehicle as described in this specification may include an automobile and a motorcycle. Hereinafter, a description will be given based on an automobile.

A vehicle as described in this specification may be, for example, an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

Figure 1:
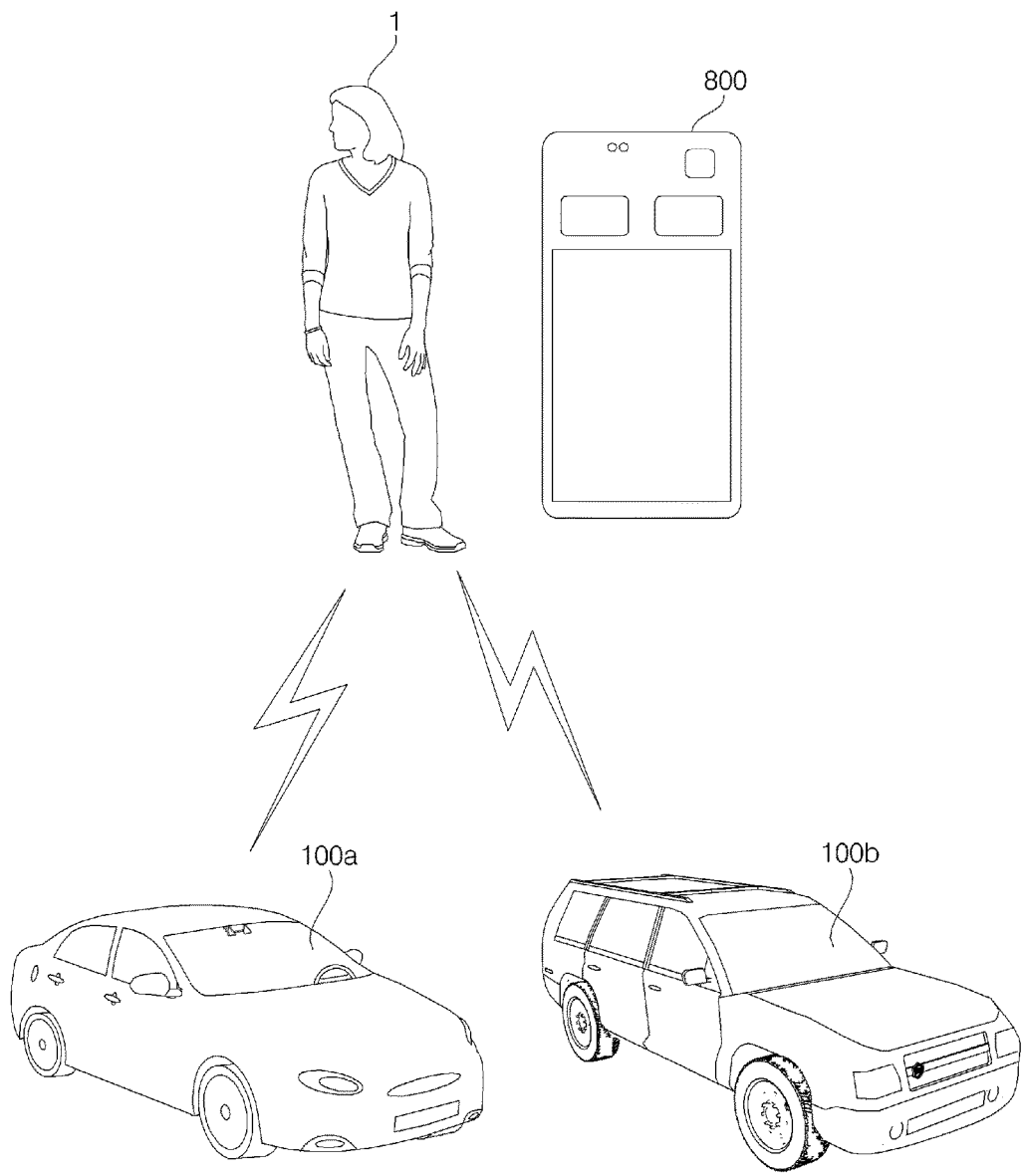
FIG. 1 is a diagram illustrating a system for a smart key for a vehicle according to an implementation.

FIG. 1 is a diagram illustrating a system for a smart key for a vehicle according to an implementation.

Referring to FIG. 1, the system may include a smart key 800 for a vehicle, and a plurality of vehicles 100a and 100b.

The system may further include a mobile terminal.

The smart key 800 may control a vehicle 100.

The smart key 800 may wirelessly transmit data, information, or a signal to the vehicle 100.

The smart key 800 may receive data, information, or a signal from the vehicle 100.

The smart key 800 may control a device, system, or configuration included in the vehicle 100.

For example, the smart key may control one or more among a user interface apparatus 200 (see FIG. 4), an object detection apparatus 300 (see FIG. 4), a communication apparatus 400 (see FIG. 4), a driving manipulation apparatus 500 (see FIG. 4), a vehicle drive apparatus, an operation system 700 (see FIG. 4), a navigation system 700 (see FIG. 4), a sensing unit 120 (see FIG. 4), and a controller 170 (see FIG. 4) of the vehicle 100.

The smart key 800 may control the plurality of vehicles 100a and 100b.

While being carried by a user 1, the smart key 800 may control at least one of the plurality of vehicles 100a and 100b.

Even in the case where the user 1 does not carry the smart key 800, the smart key 800 may control at least one of the plurality of vehicles 100 and 100b through the medium of a different device.

For example, the smart key 800 may control at least one of the plurality of vehicles 100a and 100b through the medium of a mobile terminal carried out by the user 1.

For example, the smart key 800 may control at least one of the plurality of vehicles 100a and 100b through the medium of a server.

In FIG. 1, two vehicles are illustrated as an example of the plurality of vehicles 100a and 100b, but the system may include three or more vehicles.

The plurality of vehicles 100a and 100b may be vehicles from the same manufacturer or from different manufacturers.

The same description associated with the vehicle 100 may be applied to each of the plurality of vehicles 100a and 100b.

Throughout this specification, a mobile terminal may include, for example, a mobile terminal such as a smart phone and a wearable device (for example, a glass-type, a watch-type, a band-type, a ring-type, and a neckless-type wearable device), which a user is able to carry while moving.

Figure 2:
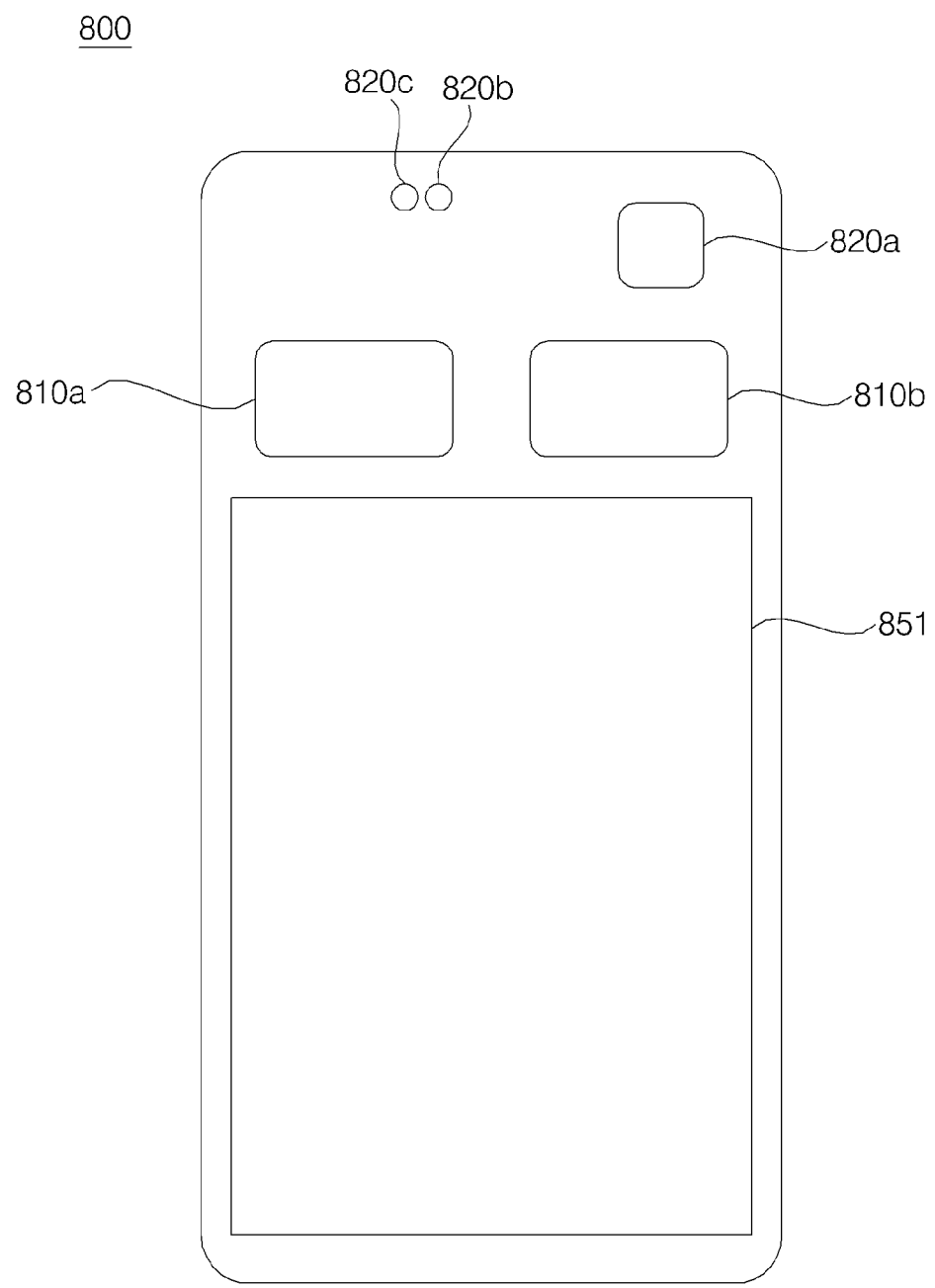
FIG. 2 illustrates the exterior appearance of a smart key according to an implementation.

FIG. 2 illustrates the exterior appearance of a smart key according to an implementation. FIG. 2 illustrates a front view of a smart key according to an implementation.

Figure 3:
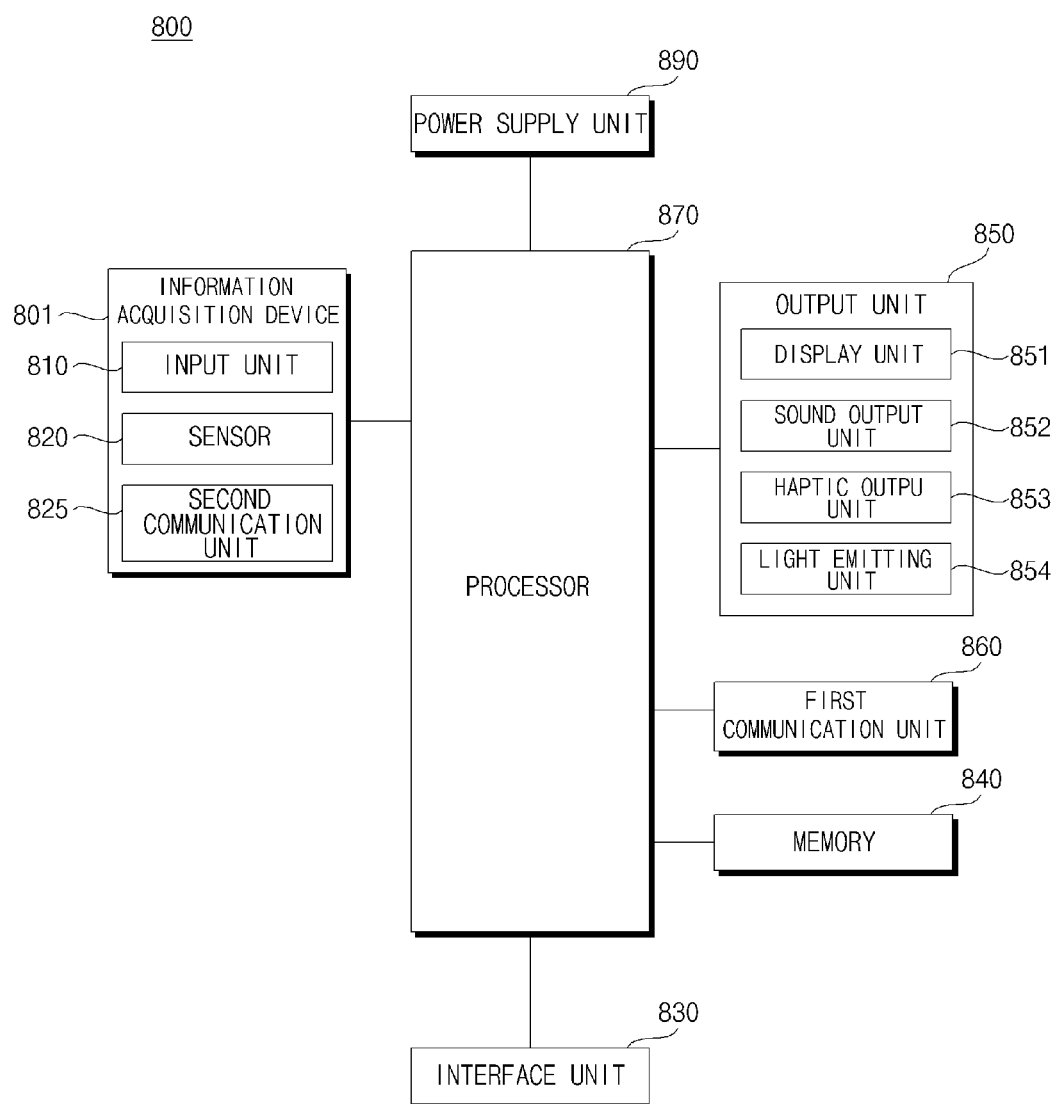
FIG. 3 is a block diagram of a smart key according to an implementation.

FIG. 3 is a block diagram of a smart key according to an implementation.

Referring to the drawings, the smart key 800 may include an information acquisition device 801, a first communication unit 860, a memory 840, at least one processor such as a processor 870, and a power supply unit 890.

In some implementations, the smart key 800 may further include an interface unit 830 and an output unit 850 as separate components or as integrated subcomponents of the smart key 800.

The information acquisition device 810 may acquire information.

The information acquisition device 801 may acquire user information.

The information acquisition device 801 may acquire key fob data of a vehicle.

The information acquisition device 801 may acquire key fob data of a vehicle other than a plurality of vehicles of which key fob data has been acquired.

For example, key fob data may be input through the input unit 810 of the information acquisition device 801.

For example, key fob data may be received through a second communication unit 825 of the information acquisition device 801 from a different device (for example, a server, a mobile terminal, and a PC).

The information acquisition device 801 may include the input unit 810.

In some implementations, the information acquisition device 801 may further include a sensor 810 and the second communication unit 825 individually or in combination.

The input unit 810 may receive a user input.

The input unit 810 may include at least one of a voice input unit, a gesture input unit, a touch input unit, and a mechanical input unit.

The input unit 810 may receive a user input for setting a degree of control authority for the vehicle.

For example, a first user may set a degree of control authority for a vehicle using the input unit 810. Then, the first user may hand a smart key over to a second user. The second user may use the vehicle within the set degree of control authority.

The input unit 810 may receive a user input for transmitting key fob data to a mobile terminal. For example, a first user may transmit key fob data for which a degree of control authority for a vehicle has been set, to a mobile terminal. Then, a second user may control the vehicle using the mobile terminal. In this case, the second user may use the vehicle within the set degree of vehicle control authority.

In FIG. 2, a first button 810a and a second button 810b are illustrated as examples of a mechanical input unit. For example, the first button 810a may be a button for opening a door of a vehicle. For example, the second button 810b may be a button for switching on an ignition system of a vehicle.

FIG. 2 illustrates an example of a touch input unit. The touch input unit may be integrally formed with the display unit 851 to be implemented as a touch screen.

For example, the display unit 851 may be a touch screen which functions as a touch input unit.

The sensor 820 may sense biometric information of a user.

The sensor 820 may acquire biometric information of the user. The sensor 820 may include various sensors capable of acquiring biometric information of the user.

For example, the sensor 820 may include a fingerprint sensor, a heart rate sensor, an iris sensor, and a face recognition sensor.

The user's biometric information sensed by the sensor 820 may be utilized to authenticate or specify the user.

FIG. 2 illustrates a fingerprint sensor 820a, an iris sensor 820b, and a face recognition sensor 820c as examples of the sensor 820.

The second communication unit 825 may perform communication with an external device.

The second communication unit 825 may receive user information from an external device through wireless communication. The external device may be a mobile terminal or a server.

The second communication unit 825 may exchange a signal with a mobile terminal.

For example, the second communication unit 825 may transmit key fob data of a vehicle that is selected for entering.

The second communication unit 825 may include a Radio Frequency (RF) circuit and an RF element which are capable of implementing a transmitter antenna, a receiver antenna, and other communication protocols for communication with the external device.

The second communication unit 825 may receive a signal for setting a degree of control authority for the vehicle from the mobile terminal.

For example, the mobile terminal may generate, based on a user input, a signal for setting a degree of control authority for the vehicle. The mobile terminal may transmit the signal for setting a degree of control authority for the vehicle to the smart key 800. The second communication unit 825 may receive the signal for setting a degree of control authority for the vehicle.

The interface unit 830 may act as a channel for various types of external device connected to the smart key 800. The interface unit 830 may include at least one of a wired/wireless headset port, an external charger port, a wired/wireless data port, a memory card port, a port connected to a device having a recognition module, an audio Input/Output (I/o) port, a video I/O port, an earphone port. In response to connection of an external device to the interface unit 830, the smart key 800 may perform an appropriate control operation related to the external device.

The memory 840 may be electrically connected to the processor 870. The memory 840 may store basic data for each unit, control data for the operational control of each unit, and input/output data.

The memory 840 may be any of various hardware storage devices, such as a ROM, a RAM, an EPROM, a flash drive, and a hard drive. The memory 840 may store various data for the overall operation of the smart key 800, such as programs for the processing or control of the processor 870.

In some implementations, the memory 840 may be integrally formed with the processor 870 or may be implemented as a subordinate element of the processor 870.

The memory 840 may store key fob data of a vehicle 100.

The key fob data may be stored in the form of a firmware of the smart key.

The key fob data may be data that is encrypted to control the vehicle 100 through communication with the vehicle 100.

The smart key 800 may be able to control the vehicle 100 only when the key fob data of the vehicle 100 is acquired.

The memory 840 may store key fob data associated with each of the plurality of controllable vehicles 100a and 100b.

For example, when key fob data associated with a different vehicle other than the plurality of vehicles 100a and 100b is acquired through the information acquisition device 801, the memory 840 may store the acquired key fob data associated with the different vehicle.

The output unit 850 may output information, data, or a screen generated or processed by the processor 870.

The output unit 850 may output information on a vehicle that is selected for entering.

The output unit 850 may output information on a route from a location of the user to a location of the selected vehicle.

The output unit 850 may generate a visual, auditory, or tactile output.

The output unit 850 may include at least one of the display unit 851, the sound output unit 852, the haptic output unit 853, and the optical output unit 854.

FIG. 2 illustrates an example of the display unit 851 as the output unit 850.

The display unit 851 may display (output) information processed by the smart key 800. For example, the display unit 851 may display information on an execution screen of an application program which is driven in the smart key 800, or User Interface (UI) or Graphic User Interface (GUI) information which is dependent upon the information on the execution screen of the application program.

The display unit 851 may be a three-dimensional (3D) display unit that displays a 3D image.

A three-dimensional (3D) technique, such as a stereoscopic (e.g., glasses type) technique, an auto-stereoscopic (e.g., non-glasses type) technique, and a projection type (e.g., holographic) technique, may be applied to the stereoscopic display unit.

The display unit 851 may form an inter-layer structure together with the touch sensor, or may be integrally formed with the touch sensor to implement a touch screen. The touch screen may function not just as the input unit 810 which provides an input interface between the smart key 800 and a user, but as an output interface between the smart key 800 and the user.

The sound output unit 852 may output audio data. The sound output unit 852 may output a sound signal related to a function performed by the smart key 800. The sound output unit 852 may include a receiver, a speaker, a buzzer, etc.

The haptic output unit 853 may generate various tactile effects that a user is able to feel. A typical tactile effect generated by the haptic output unit 853 may be vibration. Intensity and pattern of vibration generated by the haptic output unit 853 may be controlled upon a user's selection or upon the settings of a controller. For example, the haptic output unit 853 may output a combination of different types of vibration, or may output different types of vibration sequentially.

The haptic output unit 852 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic output unit 853 may be implemented to allow the user to feel a tactile effect through a muscle sensation such as fingers or arm of the user, as well as transferring the tactile effect through a direct contact. Two or more haptic output unit 853 may be provided according to the configuration of the mobile terminal 100.

The light emitting unit 854 outputs a signal to notify occurrence of an event using light generated from a light source of the smart key 800. Examples of an event occurring in the smart key 800 includes receiving data, receiving a signal, receiving information, etc.

A signal output by the light emitting unit 854 may be implemented as a mobile terminal emits light of a single color or multiple colors in a forward or rearward direction. Outputting of the signal may be finished when a user of the mobile terminal detects occurrence of an event.

The first communication unit 860 may perform communication with the vehicle 100.

The first communication unit 860 may exchange data, information, or a signal with the vehicle 100.

The first communication unit 860 may exchange data, information, or a signal with a vehicle that is selected for entering.

The first communication unit 860 may simultaneously transmit a first signal for controlling a first vehicle 100a and a second signal for controlling a second vehicle 100b.

The first communication unit 8960 may transmit a control signal to the selected vehicle based on called key fob data.

For the purpose of communication with the vehicle 100, the first communication unit 860 may include a transmitter antenna, a receiver antenna, an RF circuit able to implement various communication protocols, and an RF element.

The processor 870 may control overall operation of each unit of the smart key 800.

The processor 870 may be implemented using at least one of application specific integrated circuits (APIC), digital signal processors (DSPs), digital signal processing devices (DSPDs), programmable logic devices (PLDs), field programmable gate arrays (FPGAs), processors, controllers, micro-controller), microprocessors, and electronic units for performing other functions.

The processor 870 may acquire information on the user 1, and information on the plurality of vehicles 100*a* and 100*b*.

The processor 870 may acquire user information through the information acquisition device 801.

The user information may include at least one of: a user' authentication information, destination information, preferred vehicle driving record information, physical information, and location information.

The user's authentication information may be based on user's biometric information.

The user's physical information may include the user's age information, height information, and weight information.

The processor 870 may acquire information on the vehicle 100 through the first communication unit 860.

The information on the vehicle 100 may include at least one of the vehicle 100's location information, remaining energy (e.g., energy reserve) information, mileage information, fuel economy information, function information, and type information.

The function information of the vehicle 100 may include function information of an Advanced Driver Assistance System (ADAS).

The type information of the vehicle 100 may be information on a type of the vehicle 100 among sedan, sport utility vehicle (SUV), wagon, truck, and convertible. In addition, the type information of the vehicle 100 may be color information, size information, and manufacturer information of the vehicle 100.

The processor 870 may select, as a vehicle for entering, at least one of the plurality of vehicles, based on the user information and the information on the plurality of vehicles.

For example, the processor 870 may select, as a vehicle for entering, a vehicle having sufficient fuel or energy reserve to arrive at a destination, based on the destination information of the user or the remaining energy information and fuel economy information of each of the plurality of vehicles.

For example, the processor 870 may select, as a vehicle for entering, a vehicle nearest to the user, based on the location information of the user and the location information of each of the plurality of vehicles.

For example, the processor 870 may select, as a vehicle for entering, a vehicle having a function suitable for the user, based on the authentication information of the user and the function information of each of the plurality of vehicles.

For example, the processor 870 may select, as a vehicle for entering, a vehicle having suitable for the user's driving record, based on the driving record information of the user and the function information of each of the plurality of vehicles.

For example, the processor 870 may select, as a vehicle for entering, a vehicle having a function suitable for the user, based on the preferred vehicle information of the user and the size information, type information, or manufacturer information of each of the plurality of vehicles.

The processor 870 may exchange a signal with a vehicle for entering, through the first communication unit 860.

The processor 870 may transmit a control signal to a vehicle 100 for entering, through the first communication unit 860.

The control signal may be a signal for controlling a device, system, or configuration included in the vehicle 100.

For example, the processor 870 may transmit a signal for controlling opening a door of the vehicle 100, turning on an ignition system, and turning on an air conditioner.

For example, the processor 870 may transmit a signal for controlling the vehicle drive apparatus 600. The processor 870 may transmit a signal for controlling a speed of the vehicle 100.

The processor 870 may output information on the vehicle. In some implementations, the processor 870 may output information on a plurality of vehicles. The processor 870 may output information on a selected vehicle through the display unit 851.

For example, the processor 870 may output information on a vehicle located closest to a user. The information on the vehicle may include, for example, information on the exterior appearance of the vehicle, information on a distance between the user and the vehicle.

The processor 870 may output information on a vehicle selected for entering, through the output unit 850.

For example, the processor 870 may output at least one of the selected vehicle's location information, remaining energy information, fuel economy information, function information, type information, and repair history information.

For example, the processor 870 may output a route by foot from a location of a user to a location to the vehicle for entering, through the output unit 850.

The processor 870 may set a degree of control authority for the vehicle for entering, based on user information.

The processor 870 may transmit information on a degree of control authority to the vehicle for entering, through the first communication unit 860.

The processor 870 may determine control authority over at least one of a maximum driving speed, a maximum driving distance, a maximum distance from a reference location, a maximum driving time, permitted time of the day, or a permitted road.

In some implementations, the processor 870 may set a degree of control authority for the vehicle based on a user input received through the input unit 810.

In some implementations, the processor 870 may set a degree of control authority for the vehicle based on a signal for setting a degree of control authority for the vehicle, the signal which is received through the second communication unit 825.

For example, the processor 870 may set a degree of control authority based on the user information by selecting one of multiple steps in the speed range (e.g., 0-40, 0-50, 0-65, and 0-75 MPH).

For example, the processor 870 may set a degree of control authority based on the user information by selecting one of multiple steps of the drivable distance range (e.g., 25, 50, 100, 200 miles).

For example, the processor 870 may set a degree of control authority based on the user information, by selecting a drivable radius (range) which is divided into multiple steps and which is calculated relative to a location of a selected vehicle, or a reference location (e.g., home, rental car center, city center).

For example, the processor 870 may set a degree of control authority based on the user information, by selecting one of multiple steps in the drivable time range. Drivable time range can include maximum driving time of the vehicle. Drivable time range can include a time slot during which driving is permitted (e.g., 9 AM-5 PM, from sunrise to sundown).

For example, the processor 870 may set a degree of control authority based on the user information, by selecting at least one type of permitted roads for driving (e.g., a highway, an overpass, a vehicle-only road, a downtown road, and a local road).

The processor 870 may transmit, to a mobile terminal through the first communication unit 860, key fob data of the selected vehicle.

For example, the processor 870 may transmit key fob data of a vehicle for entering to a mobile terminal through the first communication unit 860 based on a user input received through the input unit 810.

In some implementations, key fob data of a vehicle for entering may include setting data that corresponds to a degree of control authority for the vehicle.

The processor 870 may receive user information from the mobile terminal.

The processor 870 may select a vehicle for entering, based on based on the user information and information on the plurality of vehicles.

The processor 870 may transmit the key fob data of the selected vehicle to the mobile terminal.

For example, when a user carries only a mobile terminal without the smart key 800, the mobile terminal may communicate with the smart key 800. In another example, when a first user carries the smart key 800 and a second user carries a mobile terminal, the mobile terminal may communicate with the smart key 800.

The mobile terminal receive key fob data for controlling the vehicle 100 from the smart key 800.

In this case, even without the smart key 800, the user carrying the mobile terminal is able to control the vehicle 100 by using the mobile terminal.

The processor 870 may acquire information on a first location of the mobile terminal from the mobile terminal.

The processor 870 may acquire information on a second location of the vehicle selected for entering from the vehicle selected for entering.

When it is determined that a distance from the first location to the second location is equal to or smaller than a reference distance, the processor 870 may transmit the key fob data to the mobile terminal. This type of operation may improve security.

The processor 870 may set a degree of control authority for the vehicle selected for entering, based on the user information.

The processor 870 may transmit information on the set degree of control authority, together with the key fob data, the mobile terminal.

In this case, the user carrying the mobile terminal may control the vehicle 100 within the set degree of control authority.

In the case where the vehicle 100 is controlled based on key fob data received by the mobile terminal, the vehicle 100 may be controlled within a set control authority range.

For example, in the case where a driving speed is set as a degree of control authority, the vehicle 100 is able to travel only within a set driving speed range.

For example, in the case where a driving distance is set as a degree of control authority, the vehicle 100 is able to travel only within a set driving distance range.

For example, in the case where a driving radius is set as a degree of control authority, the vehicle 100 is able to travel within a set driving radius range.

For example, in the case where a driving time is set as a degree of control authority, the vehicle 100 is able to travel only within a set driving time range.

For example, in the case where a type of a driving road is set as a degree of control authority, the vehicle 100 is able to travel only on a set road.

The processor 870 may determine whether the mobile terminal is located inside of the vehicle that is selected for entering.

For example, the processor 870 may determine whether the mobile terminal is located inside the selected vehicle, by determining whether information on a first location of the mobile terminal received from the mobile terminal and information on a second location of the selected vehicle received from the selected vehicle match with each other for a reference period of time.

When it is determined that the mobile terminal is located inside of the selected vehicle, the processor 870 may receive driving situation information from the selected vehicle.

The processor 870 may perform a remote control of the selected vehicle.

While the selected vehicle 100 is travelling, the processor 870 may transmit, to the vehicle 100, a signal for controlling the vehicle 100.

For example, suppose that a first user is a parent and carries the smart key 800 and that a second user is a child and carries a mobile terminal. In this case, upon a request from the mobile terminal, the smart key 800 transmits key fob data of a vehicle, which is selected for entering, to the mobile terminal. The selected vehicle may travel with the second user riding therein. In this case, driving situation information may be provided to the smart key 800. In this case, by manipulation of the first user, the smart key 800 may transmit, to the selected vehicle 100, a control signal for reducing a driving speed of the selected vehicle 100.

For example, suppose that a first user is a chauffeur and carries the smart key 800 and that a second user is a client and carries a mobile terminal. In this case, upon a request from the mobile terminal, the smart key 800 may transmit key fob data of a vehicle, which is selected for entering, to the mobile terminal. The selected vehicle may travel with the second user riding therein. In this case, driving situation may be provided to the smart key 800. In this case, by manipulation of the first user, the smart key 800 may transmit, to the selected vehicle 100, a control signal for reducing a driving speed of the selected vehicle 100.

The plurality of vehicle may include a first vehicle 100a and a second vehicle 100b.

Through the first communication unit 860, the processor 870 may simultaneously transmit a first signal for controlling the first vehicle 100a and a second signal is for controlling the second vehicle 100b.

The processor 870 may transmit a control signal to a second vehicle, so that the second vehicle travels following the first vehicle.

In a situation where a user needs to control both the first vehicle 100a and the second vehicle 100b, the smart key 800 may control both the first vehicle 100a and the second vehicle 100b.

While being attended in the first vehicle 100a, the user may control both the first vehicle 100a and the second vehicle 100b with the smart key 800. While driving the first vehicle 100a, the user may manipulate the smart key 800 so that the second vehicle 100b follows the first vehicle 100a.

When it is determined that a distance between the smart key 800 and a vehicle selected for entering is equal to or smaller than a reference distance, the processor 870 may transmit a control signal to the selected vehicle.

For example, the processor 870 may transmit a control signal for controlling multiple devices included in the vehicle 100 to prepare for entering and travelling in the vehicle. Specifically, the processor 870 may transmit a control signal for controlling opening a door, turning on an ignition system, and turning on an air conditioner.

The processor 870 may transmit a control signal to the selected vehicle, so that vehicle settings are set based on user information.

Vehicle setting information may include information on whether a user's preferred function is turned on, position adjustment information of a side mirror, position adjustment information of a steering wheel, location information of a seat, and information on an area of an HUD in which an image is to be displayed, interior temperature setting, and volume of the sound system.

The processor 870 may call, from the memory 840, first key fob data of a vehicle that is selected upon a user input among the plurality of vehicles.

The processor 870 may transmit a control signal to the selected vehicle through the first communication unit 860 based on called first key fob data.

The power supply unit 890 may supply power required for operation of each unit in accordance of the control of the processor 870.

The power supply unit 890 may be supplied with power from an external power source through the interface unit 830.

Figure 4:
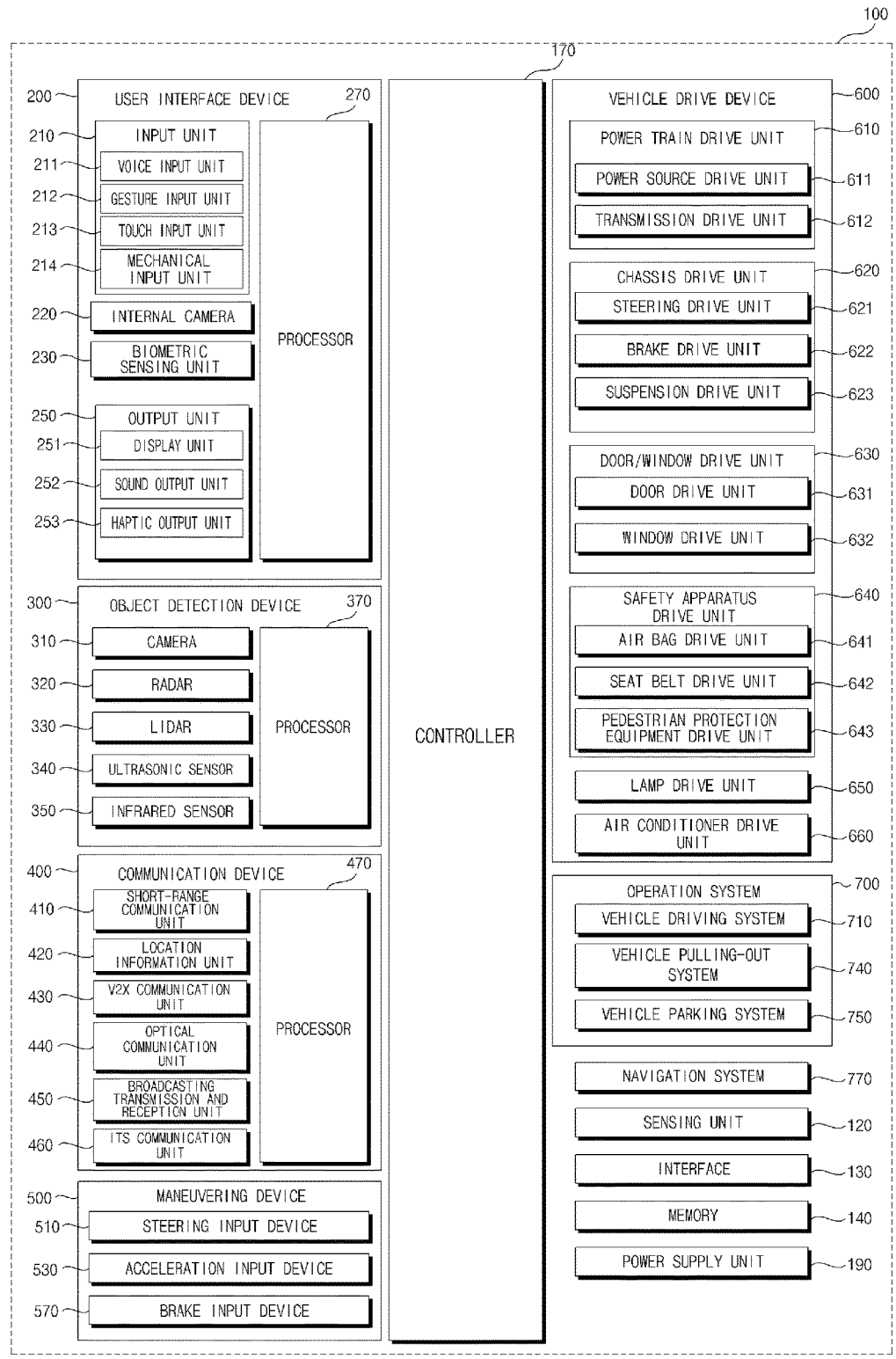
FIG. 4 is a block diagram of a vehicle according to an implementation.

FIG. 4 is a block diagram of a vehicle according to an implementation.

Referring to FIG. 4, the vehicle 100 may be an autonomous vehicle.

The vehicle 100 may switch to an autonomous mode or a manual mode based on a user input.

For example, through the user interface apparatus 200, the vehicle 100 may switch from the manual mode to the autonomous mode, or vice versa, based on a user input received through the user interface apparatus 200.

The vehicle 100 may switch to the autonomous mode or the manual mode based on driving situation information.

The driving situation information may include at least one of: information on an object located outside of the vehicle, navigation information, and vehicle state information.

For example, the vehicle 100 may switch from the manual mode to the autonomous mode, or vice versa, based on driving situation information generated by the object detection apparatus 300.

For example, the vehicle 100 may switch to the manual mode to the autonomous mode, or vice versa, based on driving situation information received through the communication apparatus 400.

The vehicle 100 may switch from the manual mode to the autonomous mode, or vice versa, based on information, data, or a signal provided from an external device.

When travelling in the autonomous mode, the vehicle 100 may travel based on the vehicle travel system 700, For example, the vehicle 100 may travel based on information, data, or a signal generated by the driving system 710, the parking-out system 740, or the parking system 750.

When travelling in the manual mode, the vehicle 100 may receive a user input to travel by use of the driving manipulation apparatus 500. The vehicle 100 may travel based on a user input received through the driving manipulation apparatus 500.

The term "overall length" means the length from the front end to the rear end of the vehicle 100, the term "overall width" means the width of the vehicle 100, and the term "overall height" means the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

As illustrated in the vehicle 100 may include the user interface apparatus 200, the object detection apparatus 300, the communication apparatus 400, the driving manipulation apparatus 500, the vehicle drive apparatus 600, the vehicle travel system 700, the navigation system 770, the sensing unit 120, the interface unit 130, the memory 140, the controller 170, and the power supply unit 190.

In some implementations, the vehicle 100 may further include other components in addition to the aforementioned components, or may not include some of the aforementioned components.

The user interface apparatus 200 is provided to support communication between the vehicle 100 and a user. The user interface apparatus 200 may receive a user input, and provide information generated in the vehicle 100 to the user. The vehicle 100 may enable User Interfaces (UI) or User Experience (UX) through the user interface apparatus 200.

The user interface apparatus 200 may include an input unit 210, an internal camera 220, a biometric sensing unit 230, an output unit 250, and a processor 270.

In some implementations, the user interface apparatus 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some implementations, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense a 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some implementations, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In some implementations, the user interface apparatus 200 may include a plurality of display units 251a to 251g. The display unit 251 may be disposed in a region of a steering wheel, a region 251a, 251b, or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface apparatus 200.

In some implementations, the user interface apparatus 200 may include a plurality of processors 270 or may not include the processor 270.

In the case where the user interface apparatus 200 does not include the processor 270, the user interface apparatus 200 may operate under control of the controller 170 or a processor of a different device inside the vehicle 100.

In some implementations, the user interface apparatus 200 may be referred to as a display device for vehicle.

The user interface apparatus 200 may operate under control of the controller 170.

The object detection apparatus 300 is configured to detect an object outside the vehicle 100. The object detection apparatus 300 may generate information on the object based on sensing data.

The information on the object may include information associated with the presence of the object, location information of the object, information on a distance between the vehicle 100 and the object, and information on a speed of movement of the vehicle 100 relative to the object.

The object may include various objects related to travelling of the vehicle 100.

The object may include a lane, a nearby vehicle, a pedestrian, a two-wheeled vehicle, a traffic signal, a light, a road, a structure, a bump, a geographical feature, an animal, etc.

The lane may be a lane in which the vehicle 100 is traveling, a lane next to the lane in which the vehicle 100 is traveling, or a lane in which a different vehicle is travelling in the opposite direction. The lane may include left and right lines that define the lane. The lane may, for example, include an intersection.

The nearby vehicle may be a vehicle that is travelling in the vicinity of the vehicle 100. The nearby vehicle OB11 may be a vehicle within a predetermined distance from the vehicle 100. For example, the nearby vehicle may be a vehicle that is preceding or following the vehicle 100.

The pedestrian may be a person located in the vicinity of the vehicle 100. The pedestrian may be a person within a predetermined distance from the vehicle 100. For example, the pedestrian may be a person on a sidewalk or on the roadway.

The two-wheeled vehicle is a vehicle located in the vicinity of the vehicle 100 and moves with two wheels. The two-wheeled vehicle may be a vehicle that has two wheels within a predetermined distance from the vehicle 100. For example, the two-wheeled vehicle may be a motorcycle or a bike on a sidewalk or the roadway.

The traffic signal may include a traffic light, a traffic sign plate, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a traffic light, and a bridge.

The geographical feature may include a mountain and a hill.

The object may be classified as a movable object or a stationary object. For example, the movable object may include, for example, a nearby vehicle and a pedestrian. For example, the stationary object may include, for example, a traffic signal, a road, and a structure.

The object detection apparatus 300 may include a camera 310, a radar 320, a lidar 330, an ultrasonic sensor 340, an infrared sensor 350, and a processor 370.

In some implementations, the object detection apparatus 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera, an Around View Monitoring (AVM) camera, or a 360-degree camera.

Using various image processing algorithms, the camera 310 may acquire location information of an object, information on a distance to the object, and information on speed relative to the object.

For example, based on change in size over time of an object in acquired images, the camera 310 may acquire information on a distance to the object and information on speed relative to the object.

For example, the camera 310 may acquire the information on a distance to the object and the information on speed relative to the object, by using a pin hole model or profiling a road surface.

For example, the camera 310 may acquire the information on a distance to the object and the information on the speed relative to the object, based on information on disparity in stereo images acquired by a stereo camera 310a.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar.

When implemented as the drive type lidar, the lidar 330 may rotate by a motor and detect an object in the vicinity of the vehicle 100.

When implemented as the non-drive type lidar, the lidar 330 may utilize a light steering technique to detect an object located within a predetermined distance from the vehicle 100. The vehicle 100 may include a plurality of non-driving type lidars 330.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection apparatus 300.

The processor 370 may detect or classify an object by comparing pre-stored data with data sensed by the camera 310, the radar 320, the lidar 330, the ultrasonic sensor 340, and the infrared sensor 350.

The processor 370 may detect and track an object based on acquired images. The processor 370 may, for example, calculate the distance to the object and the speed relative to the object.

For example, the processor 370 may acquire information on the distance to the object and information on the speed relative to the object based on a variation in size over time of the object in acquired images.

For example, the processor 370 may acquire information on the distance to the object or information on the speed relative to the object by using a pin hole model or by profiling a road surface.

For example, the processor 370 may acquire information on the distance to the object and information on the speed relative to the object based on information on disparity in stereo images acquired from the stereo camera 310a.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

In some implementations, the object detection apparatus 300 may include a plurality of processors 370 or may not include the processor 370. For example, each of the camera 310, the radar 320, the lidar 330, the ultrasonic sensor 340, and the infrared sensor 350 may include its own processor.

In the case where the object detection apparatus 300 does not include the processor 370, the object detection apparatus 300 may operate under control of the controller 170 or a processor inside the vehicle 100.

The object detection apparatus 300 may operate under control of the controller 170.

The communication apparatus 400 is configured to perform communication with an external device. Here, the external device may be a nearby vehicle, a mobile terminal, or a server.

To perform communication, the communication apparatus 400 may include at least one selected from among a transmission antenna, a reception antenna, a Radio Frequency (RF) circuit capable of implementing various communication protocols, and an RF device.

The communication apparatus 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470.

In some implementations, the communication apparatus 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some implementations, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic volume information from the traffic system and provide the traffic volume information to the controller 170. In another example, the ITS communication unit 460 may receive a control signal from the traffic system, and provide the control signal to the controller 170 or a processor provided in the vehicle 100.

The processor 470 may control the overall operation of each unit of the communication apparatus 400.

In some implementations, the communication apparatus 400 may include a plurality of processors 470, or may not include the processor 470.

In the case where the communication apparatus 400 does not include the processor 470, the communication apparatus 400 may operate under control of the controller 170 or a processor of a device inside of the vehicle 100.

In some implementations, the communication apparatus 400 may implement a vehicle display device, together with the user interface apparatus 200. In this case, the vehicle display device may be referred to as a telematics device or an Audio Video Navigation (AVN) device.

The communication apparatus 400 may operate under control of the controller 170.

The driving manipulation apparatus 500 is configured to receive a user input for driving the vehicle 100.

In the manual mode, the vehicle 100 may operate based on a signal provided by the driving manipulation apparatus 500.

The driving manipulation apparatus 500 may include a steering input device 510, an acceleration input device 530, and a brake input device 570.

The steering input device 510 may receive a user input with regard to the direction of travel of the vehicle 100. The steering input device 510 may take the form of a wheel to enable a steering input through the rotation thereof. In some implementations, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some implementations, the acceleration input device or the break input device may be configured as a touch screen, a touch pad, or a button.

The driving manipulation apparatus 500 may operate under control of the controller 170.

The vehicle drive apparatus 600 is configured to electrically control the operation of various devices of the vehicle 100.

The vehicle drive apparatus 600 may include a power train drive unit 610, a chassis drive unit 620, a door/window drive unit 630, a safety apparatus drive unit 640, a lamp drive unit 650, and an air conditioner drive unit 660.

In some implementations, the vehicle drive apparatus 600 may further include other components in addition to the aforementioned components, or may not include some of the aforementioned components.

In some implementations, the vehicle drive apparatus 600 may include a processor. Each unit of the vehicle drive apparatus 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In the case where an electric motor is the power source, the power source drive unit 611 may control the motor. The power source drive unit 611 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

In the case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

In some implementations, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

In some implementations, the suspension drive unit 623 may individually control a plurality of suspensions.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive apparatus 600 may include a processor. Each unit of the vehicle dive device 600 may include its own processor.

The vehicle drive apparatus 600 may operate under control of the controller 170.

The vehicle travel system 700 is a system for controlling the overall driving operation of the vehicle 100. The vehicle travel system 700 may operate in the autonomous driving mode.

The vehicle travel system 700 may include the driving system 710, the parking-out system 740, and the parking system 750.

In some implementations, the vehicle travel system 700 may further include other components in addition to the aforementioned components, or may not include some of the aforementioned component.

In some implementations, the vehicle travel system 700 may include a processor. Each unit of the vehicle travel system 700 may include its own processor.

In the case where the vehicle travel system 700 is implemented as software, the vehicle travel system 700 may be implemented by the controller 170.

In some implementations, the vehicle travel system 700 may include, for example, at least one selected from among the user interface apparatus 270, the object detection apparatus 300, the communication apparatus 400, the driving manipulation apparatus 500, the vehicle drive apparatus 600, the navigation system 770, the sensing unit 120, and the controller 170.

The driving system 710 may perform driving of the vehicle 100.

The driving system 710 may perform driving of the vehicle 100 by providing a control signal to the vehicle drive apparatus 600 based on navigation information from the navigation system 770.

The driving system 710 may perform driving of the vehicle 100 by providing a control signal to the vehicle drive apparatus 600 based on information on an object received from the object detection apparatus 300.

The driving system 710 may perform driving of the vehicle 100 by providing a control signal to the vehicle drive apparatus 600 based on a signal from an external device through the communication apparatus 400.

The driving system 710 may be a system which includes at least one of the user interface apparatus 270, the object detection apparatus 300, the communication apparatus 400, the driving manipulation apparatus 500, the vehicle driving device 600, the navigation system 770, the sensing unit 120, and the controller 170, and which performs driving of the vehicle 100.

The driving system 710 may be referred to as a vehicle driving control apparatus.

The parking-out system 740 may perform an operation of pulling the vehicle 100 out of a parking space.

The parking-out system 740 may perform an operation of pulling the vehicle 100 out of a parking space, by providing a control signal to the vehicle drive apparatus 600 based on navigation information from the navigation system 770.

The parking-out system 740 may perform an operation of pulling the vehicle 100 out of a parking space, by providing a control signal to the vehicle drive apparatus 600 based on information on an object received from the object detection apparatus 300.

The parking-out system 740 may perform an operation of pulling the vehicle 100 out of a parking space, by providing a control signal to the vehicle drive apparatus 600 based on a signal received from an external device.

The parking-out system 740 may be a system which includes at least one of the user interface apparatus 270, the object detection apparatus 300, the communication apparatus 400, the driving manipulation apparatus 500, the vehicle driving device 600, the navigation system 770, the sensing unit 120, and the controller 170, and which performs an operation of pulling the vehicle 100 out of a parking space.

The parking-out system 740 may be referred to as a vehicle parking-out control apparatus.

The parking system 750 may perform an operation of parking the vehicle 100 in a parking space.

The parking system 750 may perform an operation of parking the vehicle 100 in a parking space, by providing a control signal to the vehicle drive apparatus 600 based on navigation information from the navigation system 770.

The parking system 750 may perform an operation of parking the vehicle 100 in a parking space, by providing a control signal to the vehicle drive apparatus 600 based on information on an object received from the object detection apparatus 300.

The parking system 750 may perform an operation of parking the vehicle 100 in a parking space, by providing a control signal to the vehicle drive apparatus 600 based on a signal from an external device.

The parking system 750 may be a system which includes at least one of the user interface apparatus 270, the object detection apparatus 300, the communication apparatus 400, the driving manipulation apparatus 500, the vehicle driving device 600, the navigation system 770, the sensing unit 120, and the controller 170, and which performs an operation of parking the vehicle 100.

The parking system 750 may be referred to as a vehicle parking control apparatus.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some implementations, the navigation system 770 may update pre-stored information by receiving information from an external device through the communication apparatus 400.

In some implementations, the navigation system 770 may be classified as an element of the user interface apparatus 200.

The sensing unit 120 may sense the state of the vehicle. The sensing unit 120 may include an attitude sensor (e.g., a yaw sensor, a roll sensor, and a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information associated with the pressure applied to an accelerator pedal, and information associated with the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle state information may be information that is generated based on data sensed by various sensors provided inside the vehicle 100.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

In some implementations, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some implementations, the memory 140 may be integrally formed with the controller 170, or may be provided as an element of the controller 170.

The controller 170 may control the overall operation of each unit inside the vehicle 100. The controller 170 may be referred to as an Electronic Controller (ECU).

The power supply unit 190 may supply power required to operate each component under control of the controller 170.

In particular, the power supply unit 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Figure 5:
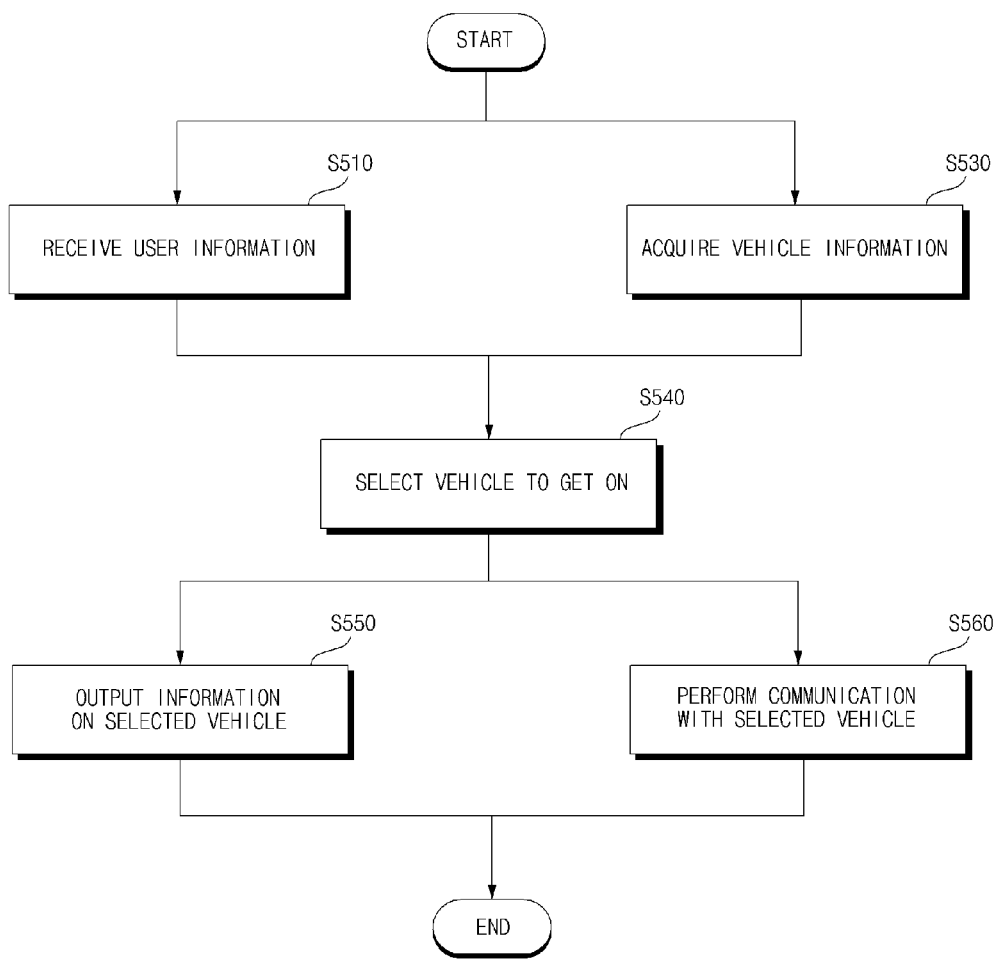
FIG. 5 is a flowchart of an operation of a smart key according to an implementation.

FIG. 5 is a flowchart of an operation of a smart key according to an implementation.

Referring to FIG. 5, the processor 870 may acquire user information through the information acquisition device 801 in S510.

The user information may include at least one of a user's authentication information, destination information, preferred vehicle information, driving record information, physical information, and location information.

In some implementations, the user's authentication information may be based on user biometric information.

The user's information may be acquired through the input unit 810, the sensor 820, and the second communication unit 825 included in the information acquisition device 801.

The processor 870 may authenticate and specify a user based on the user information.

The processor 870 may acquire information on a plurality of vehicles through the first communication unit 860 in S530.

The information on the plurality of vehicles may include at least one of each vehicle's location information, remaining energy information, mileage information, fuel economy information, function information, and type information.

The processor 870 may select, as a vehicle for entering, at least one of the plurality of vehicles based on the user information and the information on the plurality of vehicles in S540.

The processor 870 may output information on the selected vehicle through the output unit 850 in S550.

For example, the processor 870 may output at least one of the selected vehicle's location information, remaining energy information, mileage information, fuel economy information, function information, type information, and repair history information.

The processor 870 may perform communication with the selected vehicle 100 in S560.

The processor 870 may transmit, to the selected vehicle 100, a signal for controlling a device, system, or a configuration included in the selected vehicle 100.

The processor 870 may receive driving situation information from the selected vehicle 100.

Figure 6A:
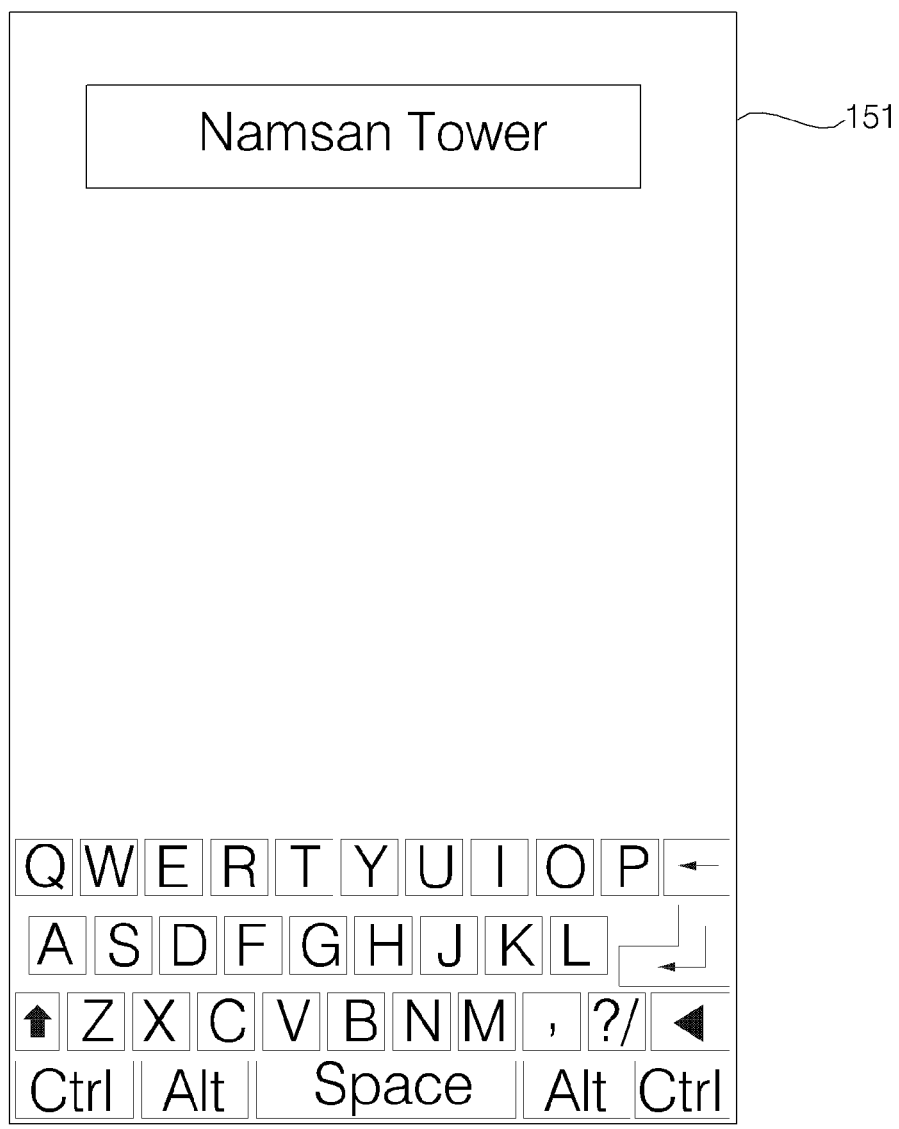
FIGS. 6A to 6C are diagrams illustrating an example of an operation of acquiring information according to an implementation.
Figure 6B:
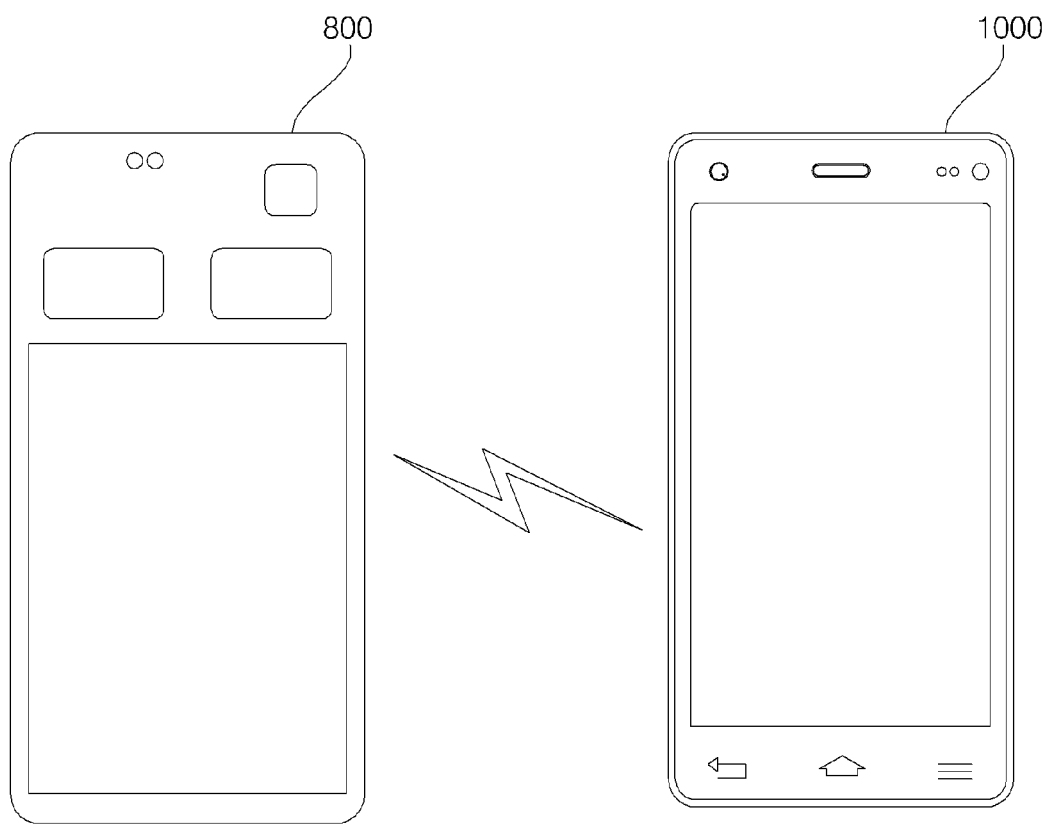
Figure 6C:
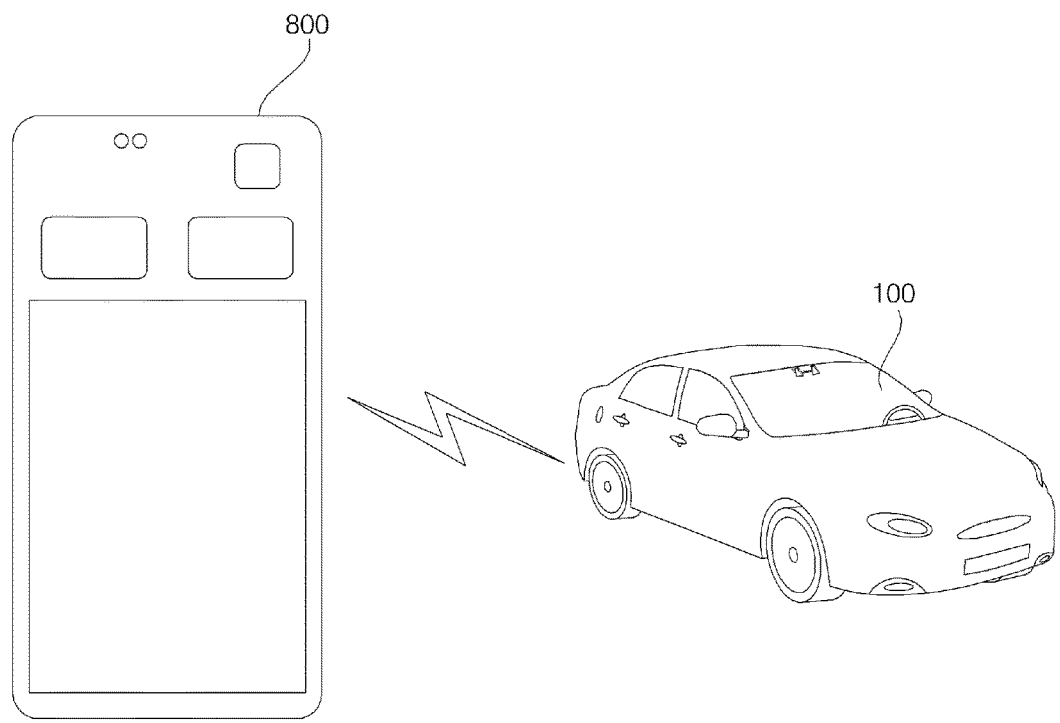

FIGS. 6A to 6C illustrate an example of an operation of acquiring information according to an implementation.

Referring to FIG. 6A, when the display unit 151 is implemented as a touch screen, the display unit 151 may act as the input unit 810.

The processor 870 may receive a user input through the display unit 151.

For example, if a user inputs a destination through the display unit 151, the processor 870 may acquire a user's destination information.

Although FIG. 6A shows an example of an operation of acquiring the user's destination information, the processor 870 may acquire the user's authentication information, preferred vehicle information, driving record information, physical information, location information, in addition to the destination information.

Referring to FIG. 6B, the processor 870 may acquire user information from a mobile terminal 1000 through the second communication unit 825.

For example, the processor 870 may receive PIN information of the mobile terminal 1000, and authenticate the user based on the PIN information of the mobile terminal 1000.

For example, the processor 870 may receive the user's destination information, preferred vehicle information, driving record information, user physical information which are input through the mobile terminal 1000.

For example, the processor 870 may acquire the user's location information by receiving GPS information of the mobile terminal 1000.

Referring to FIG. 6C, the processor 870 may acquire information on the vehicle 100 from the vehicle 100 through the first communication unit 860.

Through the first communication unit 860, the processor 870 may receive at least one of the vehicle 100's location information, remaining energy information, mileage information, fuel economy information, function information, and type information.

The processor 870 may acquire driving situation information from the vehicle 100 through the first communication unit 860.

Figure 7A:
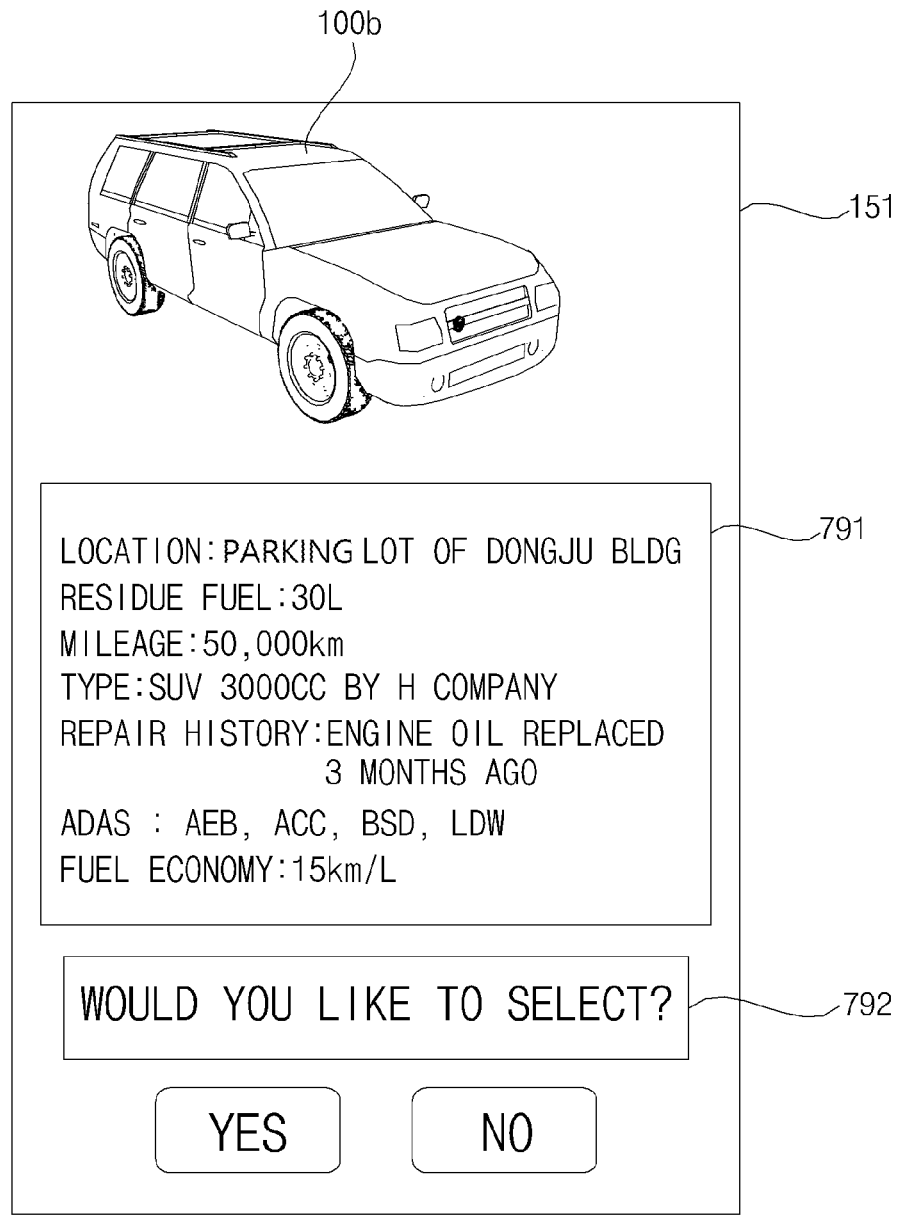
FIGS. 7A and 7B are diagrams illustrating an example of an operation of outputting information on a selected vehicle, according to an implementation.
Figure 7B:
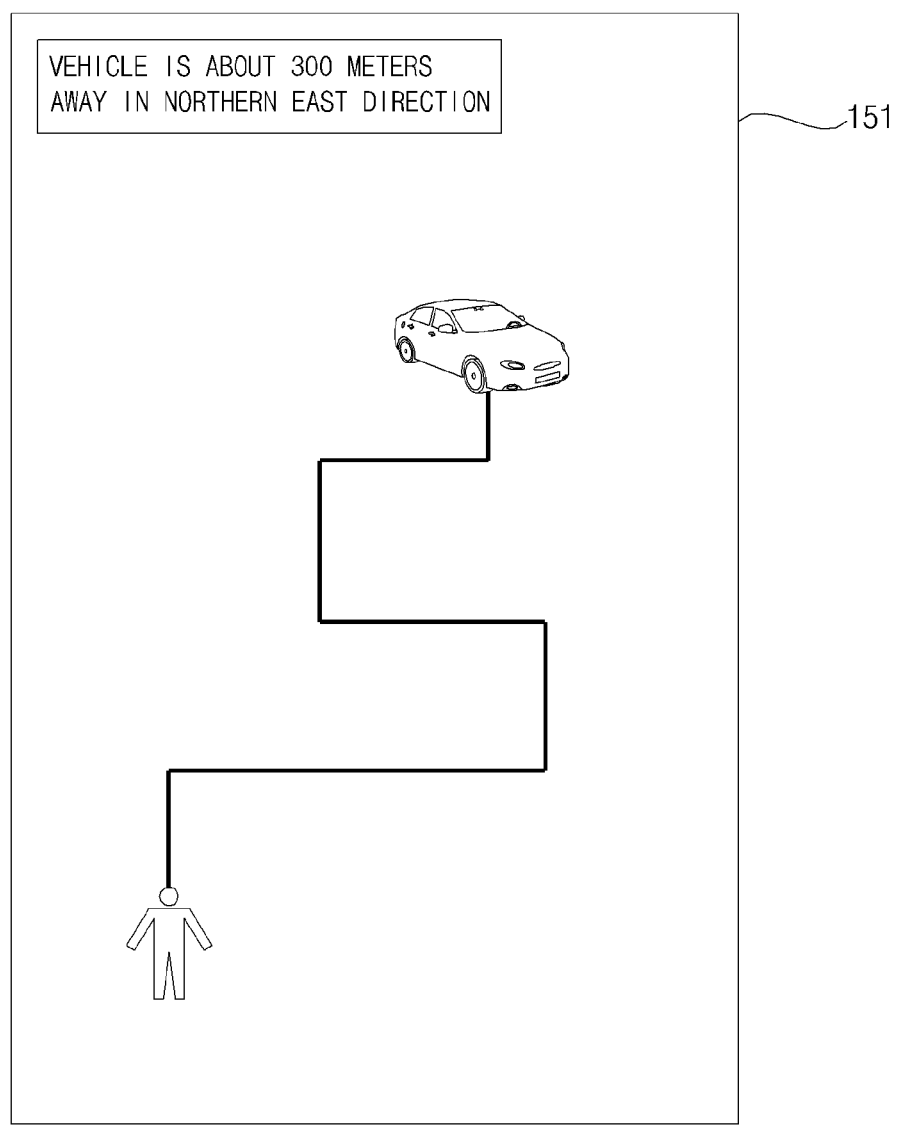

FIGS. 7A and 7B illustrate an example of an operation of outputting information on a selected vehicle, according to an implementation.

Referring to FIG. 7A, the processor 870 may output information 791 on a vehicle selected for entering, through the output unit 850.

As illustrated in FIG. 7A, the processor 870 may perform a control operation so that the selected vehicle's location information, remaining energy information, mileage information, type information, repair history information, function information, and fuel economy information are displayed on the display unit 151.

The processor 870 may display, on the display unit 151, an input area 792 through which it is possible to receive an input regarding a user's selection for the selected vehicle.

Referring to FIG. 7B, the processor 870 may output, through the display unit 851, information on a route by foot (walking route) from a location of the user to a location of a vehicle 100 that is selected for entering.

The processor 870 may transmit a control signal to the selected vehicle 100 so that a horn or lamp of the selected vehicle 100 operates.

Figure 8:
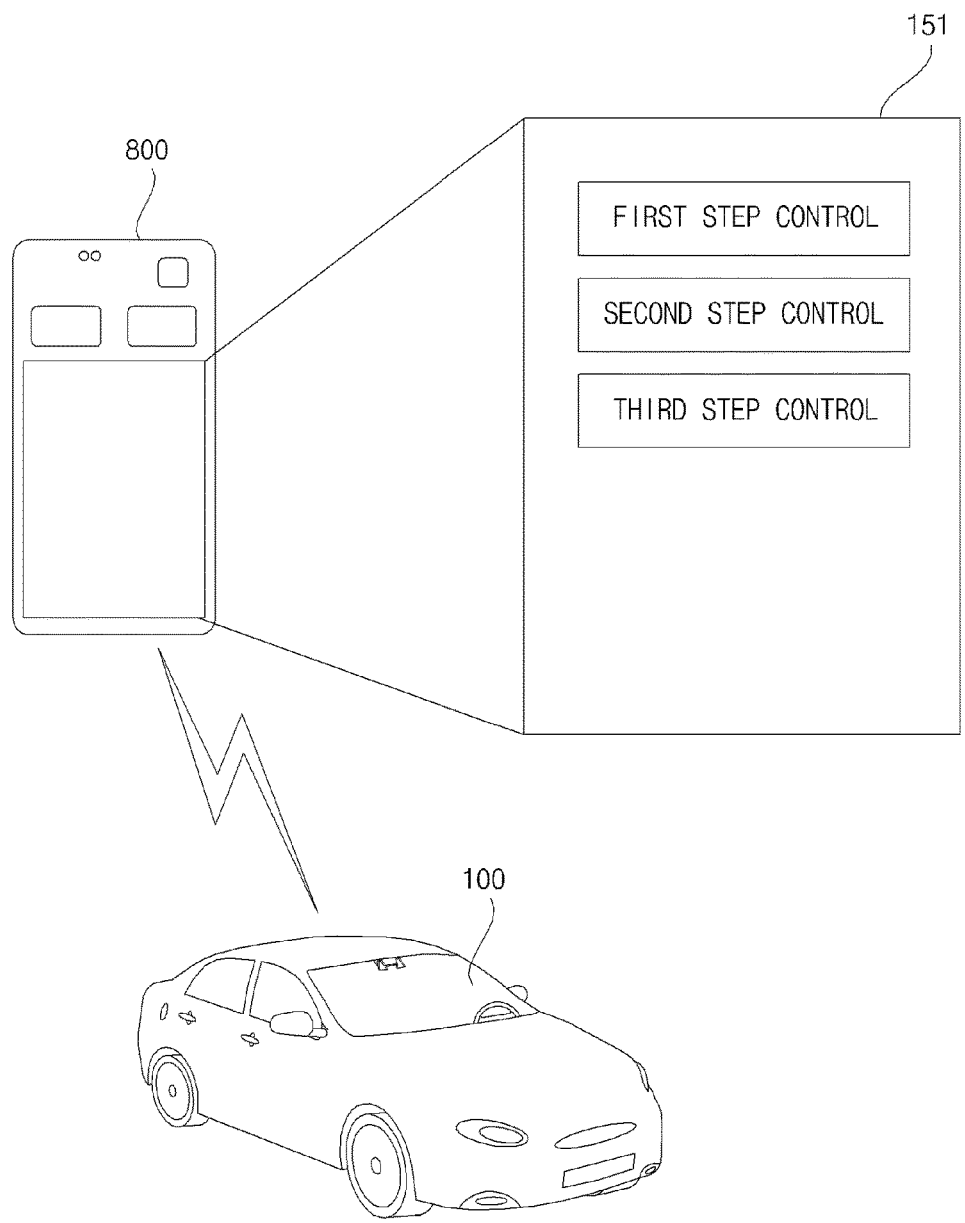
FIG. 8 is a diagram illustrating an example of an operation of setting a degree of control authority for a vehicle, according to an implementation.

FIG. 8 illustrates an example of an operation of setting a degree of control authority for a vehicle, according to an implementation.

Referring to FIG. 8, the processor 870 may set a degree (level) of control authority for a vehicle 100 selected for entering, based on user information.

The processor 870 may set at least one of a maximum driving speed, a maximum driving distance, a maximum distance from a reference location, a maximum driving time, permitted timeslot, or a permitted road through the degree of control authority.

The processor 870 may transmit information on the degree of control authority through the first communication unit 860 to the selected vehicle 100.

The selected vehicle 100 may operate based on the information on the set degree of control authority.

For example, the processor 870 may set a maximum drivable speed or a drivable road based on a user's driving record information.

For example, the processor 870 may set a maximum drivable distance or a maximum drivable range from a reference location based on a user's destination information or location information.

For example, the processor 870 may set a permitted timeslot (e.g., 9 AM to 8 PM) for driving based on user information.

For example, the processor 870 may set a maximum drivable speed, a maximum drivable distance, or a maximum drivable time based on a user's physical information.

In some implementations, the processor 870 may perform a control operation so that the information on the degree of control authority is displayed on the display unit 851.

In some implementations, when a user performs a control operation beyond a set control authority, the selected vehicle 100 may transmit an alarming message to the smart key 800. The smart key 800 may receive the alarming message. In this case, in some implementations, a set value indicative of a preset degree of control authority may be changed.

In some implementations, the processor 870 may set of a degree of control authority for a specific valid time. If the specific valid time is expired, the processor 870 may renew the valid time or change the set value.

Figure 9:
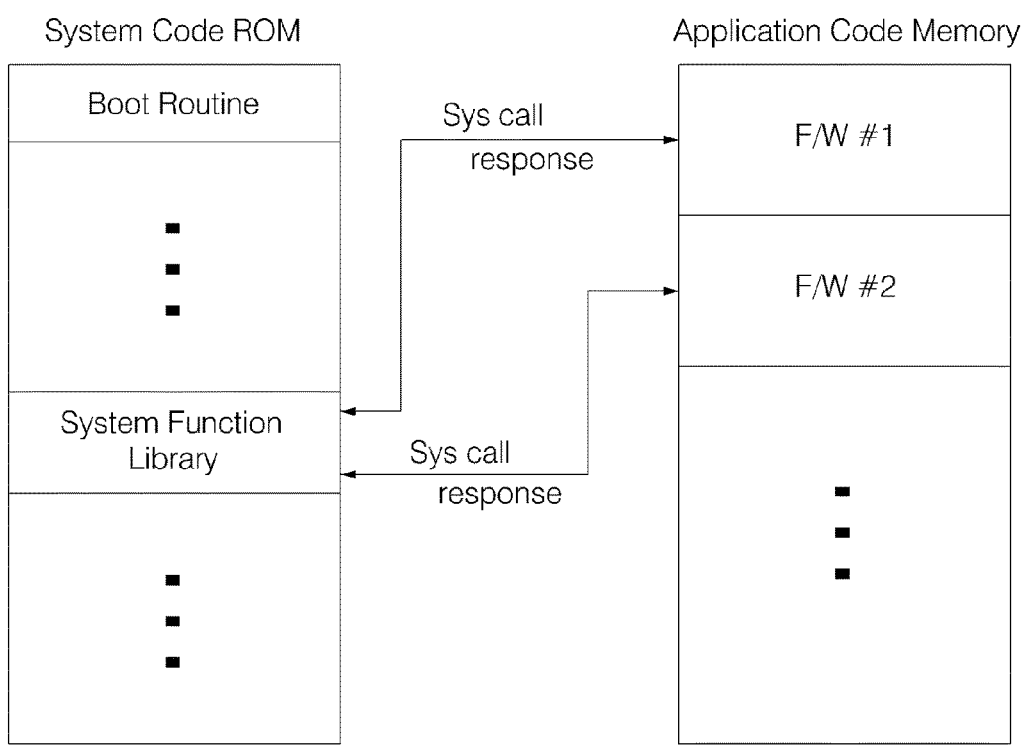
FIG. 9 is a diagram illustrating an example memory map according to an implementation.

FIG. 9 illustrates an example memory map according to an implementation.

Referring to FIG. 9, the memory 840 may store key fob data of each of a plurality of vehicles.

The key fob data may be stored in the form of firmware. The key fob data may be stored as a portion of a firmware of the smart key.

Based on key fob data received from the smart key 800, the vehicle 100 may perform an operation in accordance with a control signal transmitted by the smart key 800.

Based on key fob data received from the mobile terminal 1000, the vehicle 100 may perform an operation in accordance with a control signal transmitted by the mobile terminal 1000.

For example, if key fob data conforming to data stored in the vehicle 100 is received from the smart key 800 or the mobile terminal 1000, the vehicle 100 operates in accordance with a received control signal.

For example, if key fob data not conforming to data stored in the vehicle 100 is received from the smart key 800 or the mobile terminal 1000, the vehicle 100 does not operate in accordance with a received control signal.

The memory 840 may include a region for a system code ROM and a region for an application code memory.

The region for a system code ROM is a region in which data for controlling the vehicle 100 is stored.

The region for an application code memory is a region in which a plurality of key fob data is stored.

Under the control of the processor 870, one of the plurality of key fob data in the form of firmware may be called to a system function library in the region for a system code ROM.

When first key fob data is called, the processor 870 may control a first vehicle corresponding to the first key fob data.

When second key fob data is called, the processor 870 may control a second vehicle corresponding to the second key fob data.

Figure 10:
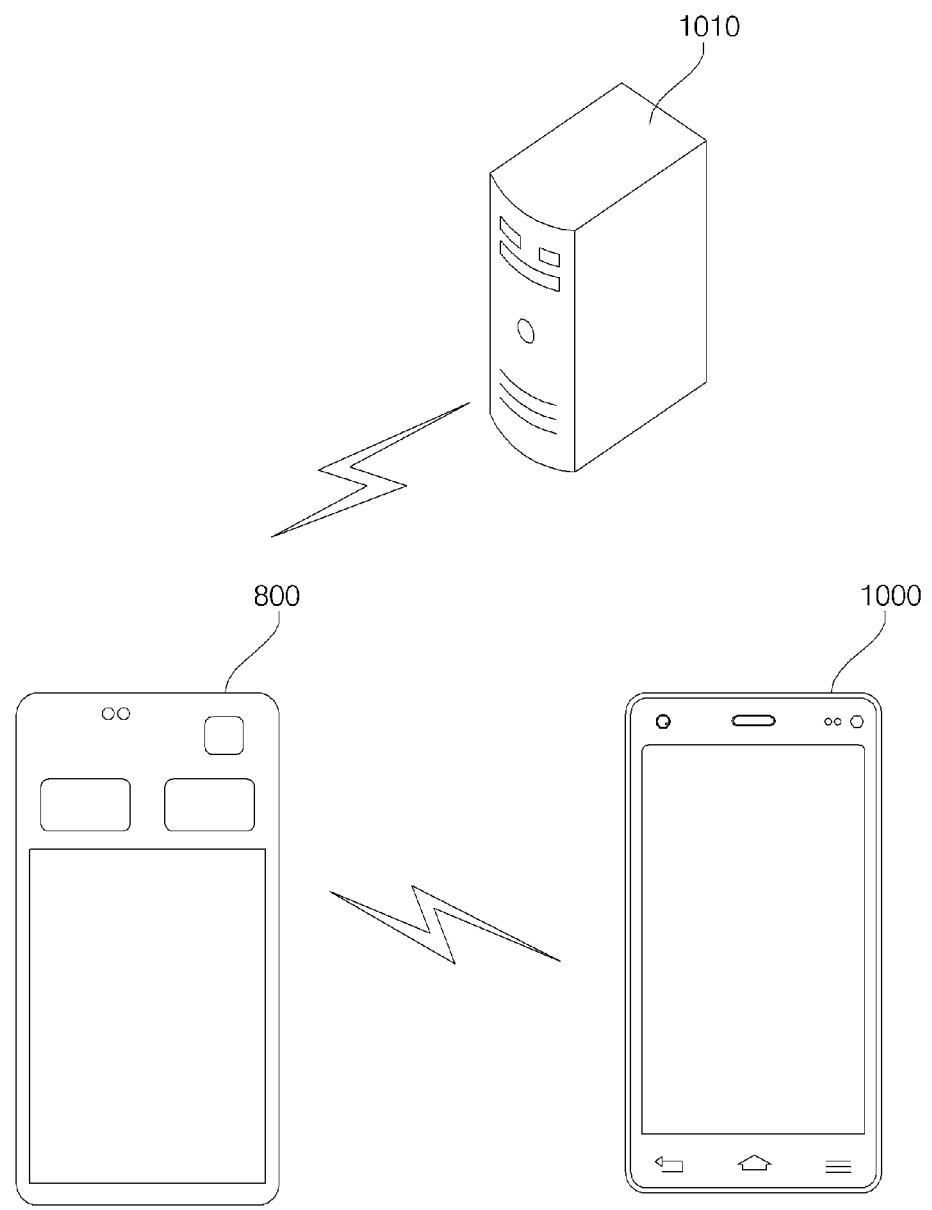
FIG. 10 is a diagram illustrating an example operation of acquiring key fob data according to an implementation.

FIG. 10 illustrates an example operation of acquiring key fob data according to an implementation.

Referring to FIG. 10, in addition to already-acquired key fob data, the information acquisition device 801 may further acquire key fob data of another vehicle.

For example, the processor 870 may acquire additional key fob data in accordance with a user input received through the input unit 810.

For example, the processor 870 may receive key fob data from a server 1010 through the second communication unit 825.

For example, the processor 870 may receive key fob data from the mobile terminal 1000 through the second communication unit 825.

The acquired key fob data may be stored in the memory 840.

In some implementations, the received key fob data may be stored in different regions of the firmware of the smart key, the different regions each being dedicated for each of the plurality of vehicles.

In some implementations, the received key fob data may overwrite previously stored key fob data associated with a vehicle. Such process may be performed by flashing the memory of the smart key.

For example, the acquired key fob data is stored in the region for an application code memory of the memory 840.

Figure 11:
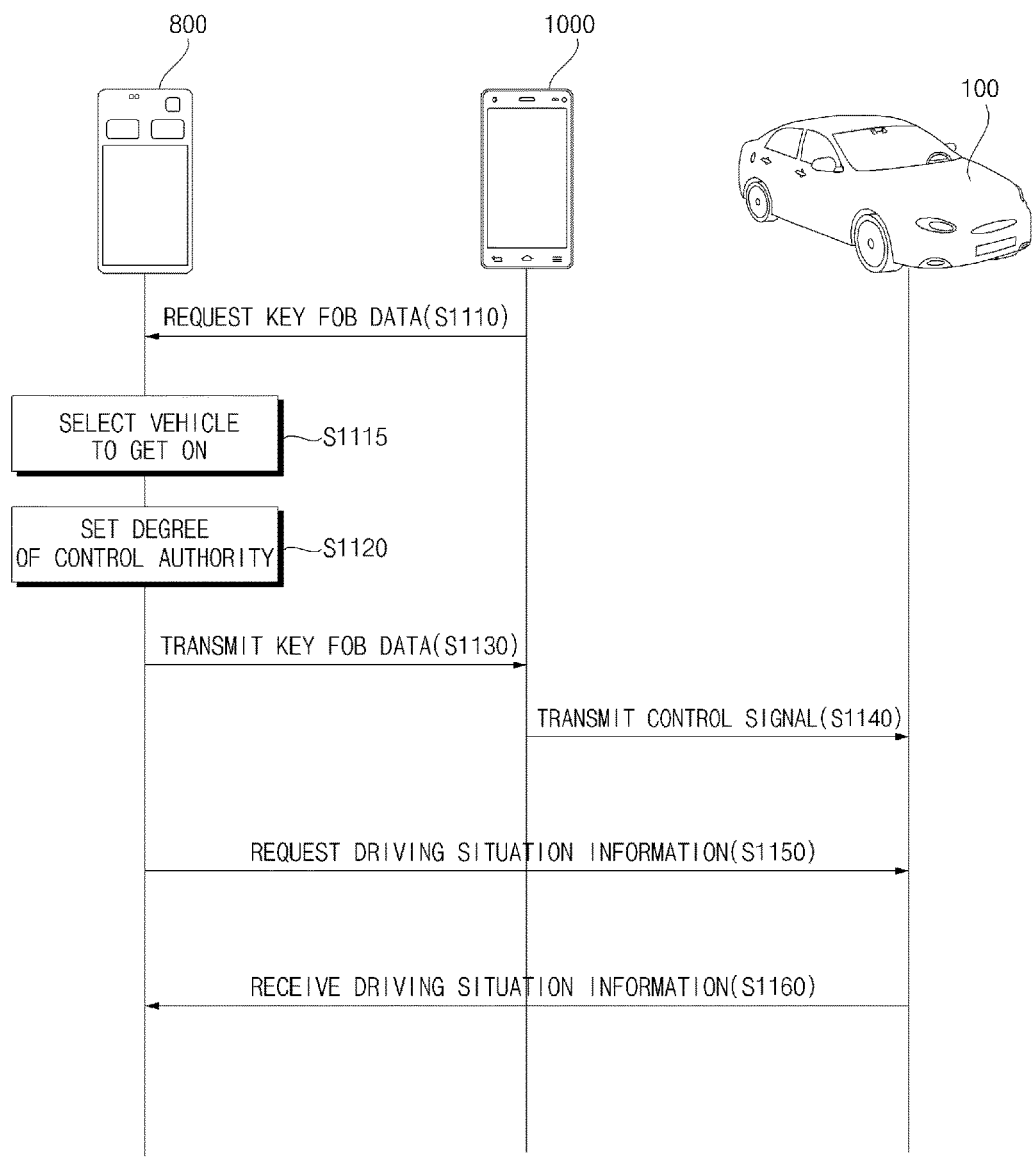
FIG. 11 is a diagram illustrating an example operation of a smart key, a mobile terminal, and a vehicle according to an implementation.

FIG. 11 illustrates an example operation of a smart key, a mobile terminal, and a vehicle according to an implementation.

The processor 870 receives a key fob data request signal from the mobile terminal 1000 through the second communication unit 825 in S1110.

The processor 870 may receive user information together with the key fob data request signal.

The processor 870 may select a vehicle 100 for entering, based on the user information and information on a plurality of vehicles in S1115.

The processor 870 may set a degree of control authority based on the user information in S1120.

The processor 870 may transmit key fob data of the selected vehicle 100 to the mobile terminal 1000 in S1130.

In this case, together with the key fob data, the processor 870 may transmit information on the degree of control authority to the mobile terminal 1000.

In some implementations, the processor 870 may transmit the information on the degree of control authority to the vehicle 100.

The mobile terminal 1000 may transmit a control signal to the vehicle 100 based on the received key fob data in S1140.

The vehicle 100 operates based on a received control signal.

When the vehicle 100 is travelling and the mobile terminal 100 is located therein, the processor 870 may request driving situation information from the vehicle 100 through the first communication unit 860 in S1150.

The processor 870 may receive the driving situation information from the vehicle 100 through the first communication unit 860 in S1160.

Figure 12A:
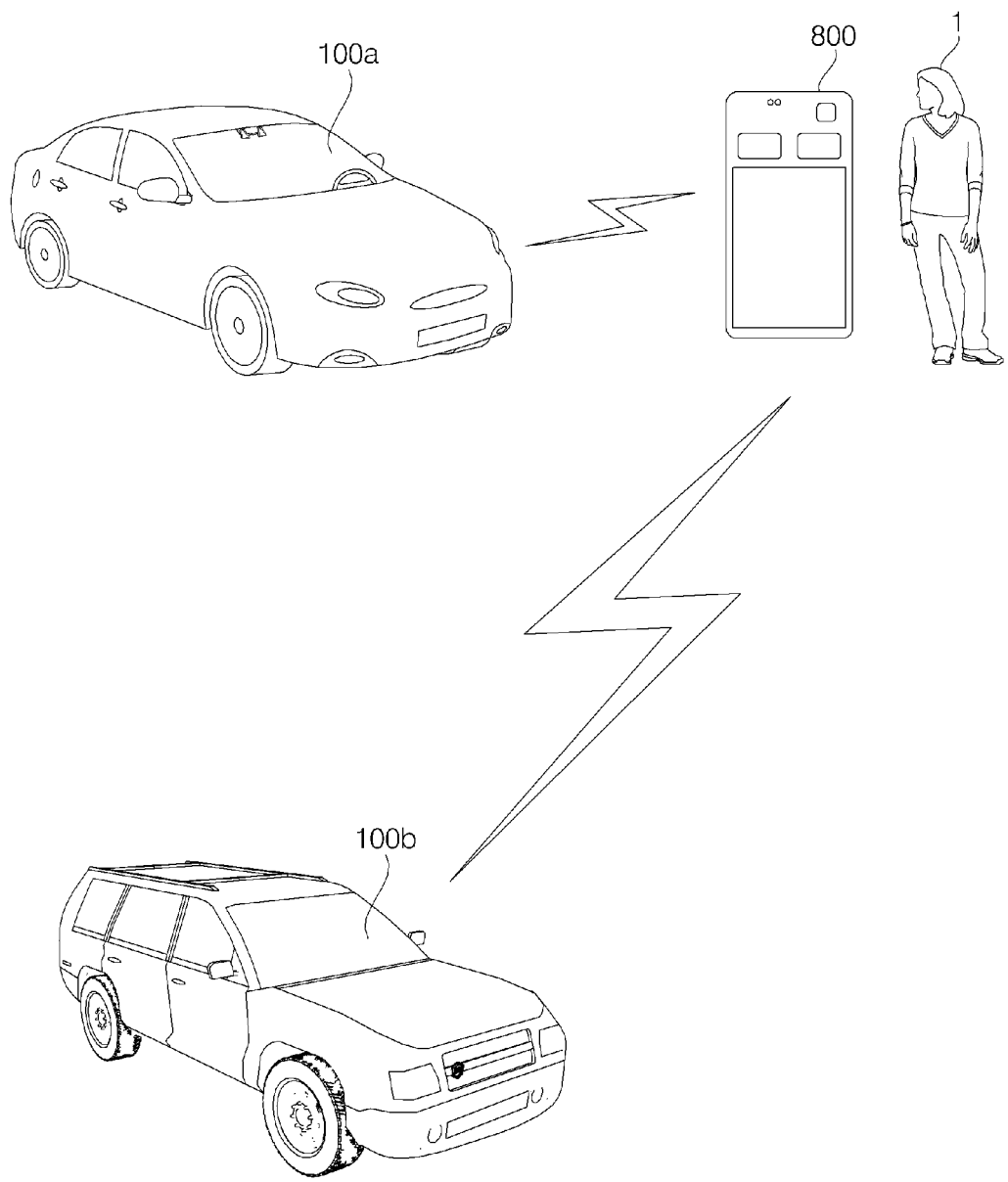
FIGS. 12A and 12B are diagrams illustrating an example operation of controlling a plurality of vehicles according to an implementation.
Figure 12B:
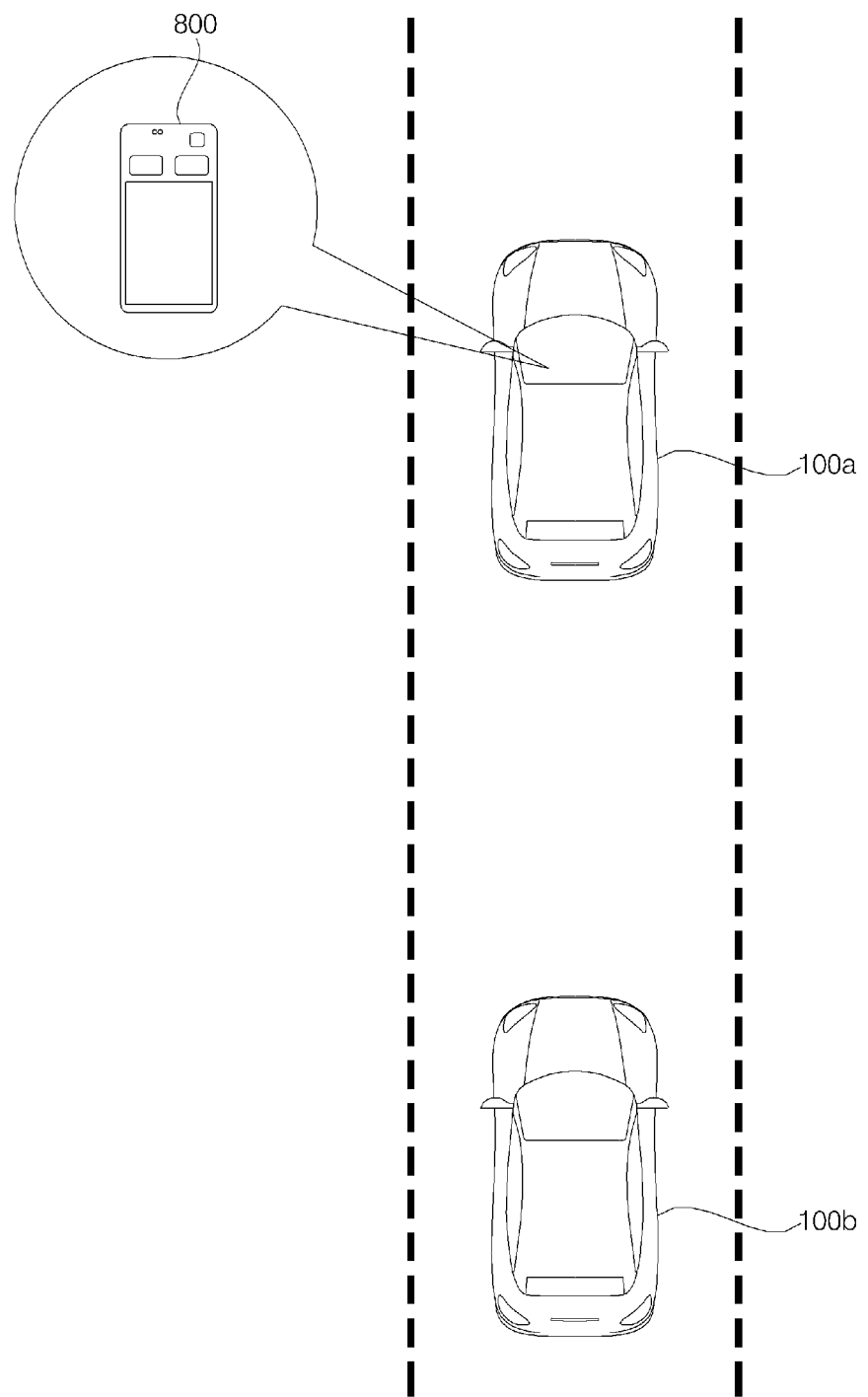

FIGS. 12A and 12B illustrate an example operation of controlling a plurality of vehicles according to an implementation.

Referring to FIGS. 12A and 12B, the smart key 800 may control the first vehicle 100a and the second vehicle 100b at the same time.

Through the first communication unit 860, the processor 870 may simultaneously transmit a first control for controlling the first vehicle 100a and a second signal for controlling the second vehicle 100b.

The processor 870 may control the first vehicle 100a.

The processor 870 may control opening of a door of the first vehicle 100a and turning on an ignition system thereof.

The processor 870 may control turning on an ignition system of the second vehicle 100b.

With carrying the smart key 800, the user 1 may get on the first vehicle 100a. The first vehicle 100a is driven by the user 1.

While the first vehicle 100a is travelling ahead of the second vehicle 100b, the processor 870 may transmit a control signal to the second vehicle 100b so that the second vehicle 100b follows the first vehicle 100a.

In this case, the second vehicle 100b may travel following the first vehicle 100a that is driven by the user 1.

In some implementations, in the case where the second vehicle 100b is not an autonomous vehicle, the second vehicle 100b may be able to follow the first vehicle 100 in a manner similar to vehicle platooning, by using an object detection apparatus provided in the second vehicle 100b.

In this manner, a single user is capable of moving a plurality of vehicles to a destination.

Figure 13:
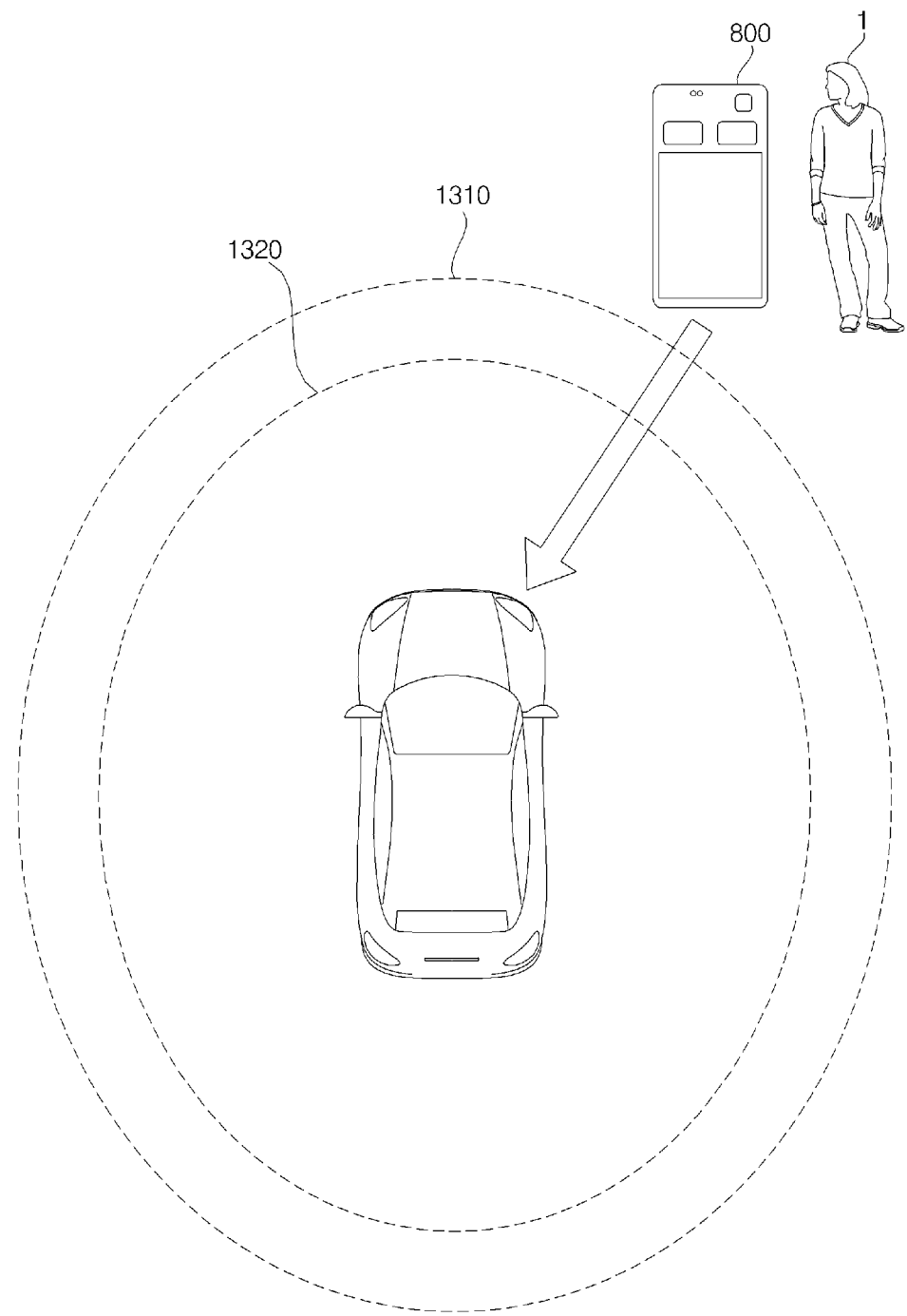
FIG. 13 is a diagram illustrating an example operation of controlling a vehicle based on a distance between a smart key and the vehicle, according to an implementation.

FIG. 13 illustrates an example operation of controlling a vehicle based on a distance between a smart key and the vehicle, according to an implementation.

Referring to FIG. 13, the smart key 800 may transmit a control signal to the vehicle 100, which is selected for entering, through the first communication unit 860 based on information on a distance to the vehicle 100.

The smart key 800 may acquire the information on a distance to the vehicle 100.

For example, the smart key 800 may acquire information on a distance between the smart key 800 and the vehicle 100 based on GPS information of the smart key 800 and the vehicle 100.

For example, when communicating with the vehicle 100, the smart key 800 may acquire information on a distance between the smart key 800 and the vehicle 100 based on communication strength.

For example, the smart key 800 may receive information on an object (e.g., a user) acquired by the object detection apparatus 300 of the vehicle 100, and acquire information on a distance between the smart key 800 and the vehicle 100 based on the received information on the object.

When it is determined that the distance between the smart key 800 and the vehicle 100 is equal to or smaller than a reference distance, the processor 870 may transmit a control signal to the vehicle 100.

For example, when it is determined that a distance between the smart key 800 and a vehicle 100 selected for entering is equal to or smaller than a first reference distance 1310, the processor 870 may transmit a control signal to the vehicle 100 so that the vehicle 100 performs a first operation.

The first operation may be at least one of opening a door, opening a trunk, turning on an ignition system, turning on an Audio Video (AV) device, turning on an air conditioner, and turning on various heating wire device.

For example, when it is determined that a distance between the smart key 800 and a vehicle 100 selected for entering is equal to or smaller than a second reference distance 1320, the processor 870 may transmit a control signal to the vehicle 100 so that a vehicle state is set based on user information.

Setting of the vehicle state may include at least one of positioning a handle, positioning a seat, positioning a side mirror, positioning a rear-view mirror, turning on/off an ADAS function, and turning on/off an air conditioner.

Figure 14A:
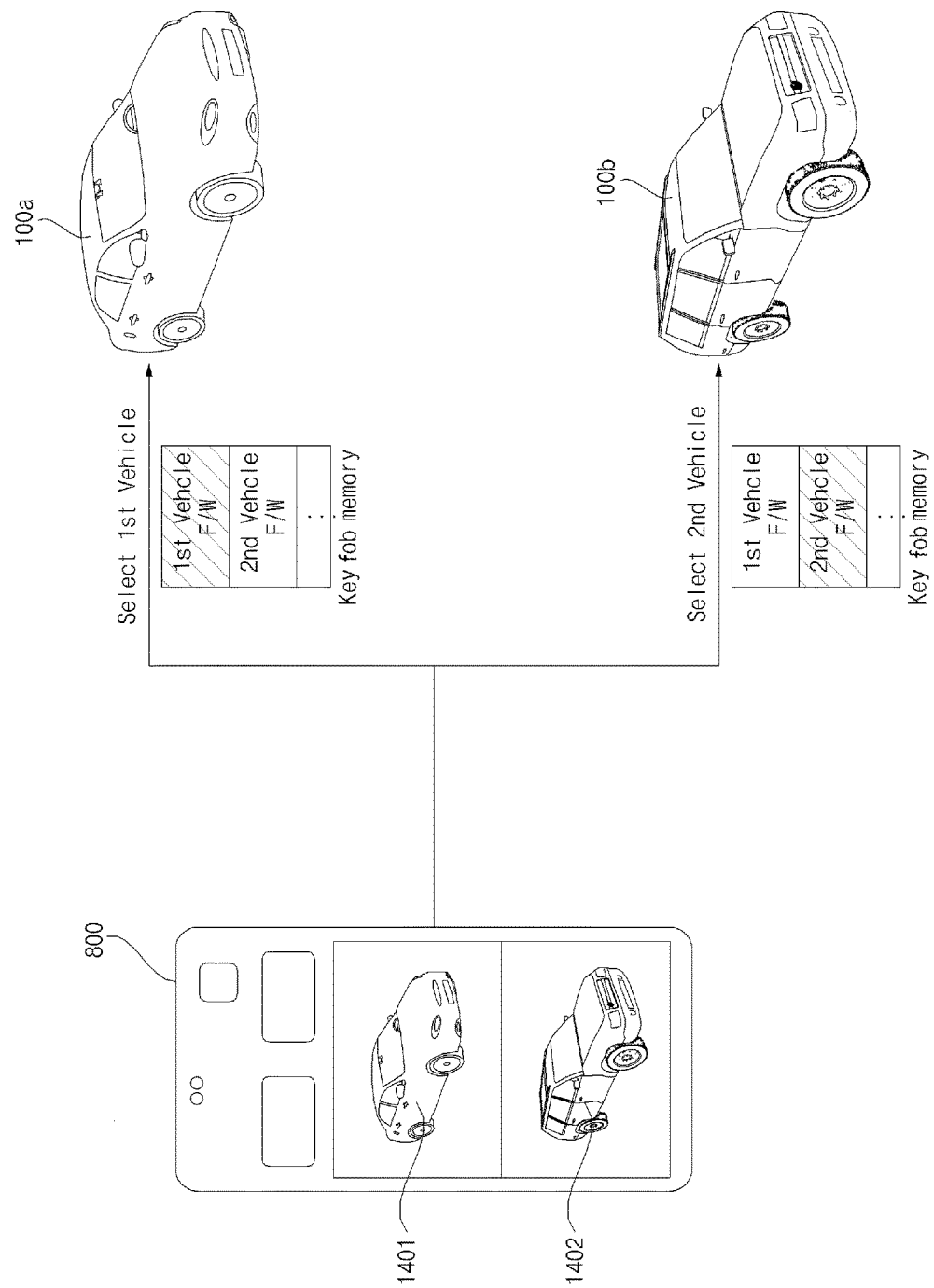

FIGS. 14A and 14B illustrate an example operation of a smart key according to an implementation.

FIG. 14A is a diagram illustrating how to select a vehicle for entering upon a user's selection according to an implementation.

Referring to FIG. 14A, the memory 840 may store key fob data of each of a plurality of vehicles 100a and 100b.

For example, the memory 840 may store, in an application code memory, first key fob data in the form of firmware of the first vehicle 100a, and second key fob data in the form of firmware of the second vehicle 100b.

The input unit 810 may receive a user input.

For example, while a first image 1401 corresponding to the first vehicle 100a and a second image 1402 corresponding to the second vehicle 100b are displayed on the display unit 851, the processor 870 may receive a touch input that selects any one of the first image 1401 and the second image 1402 through the display unit 851.

The processor 870 may call key fob data corresponding to a vehicle that is selected by the user input from among the plurality of vehicles 100a and 100b.

The processor 870 may output information on the selected vehicle through the output unit 850.

For example, the processor 870 may perform a control operation so that various information such as the selected vehicle's location information, remaining energy information, mileage information, type information, repair history information, function information, fuel economy information, current availability information are displayed on the display unit 151.

The processor 870 may transmit a control signal to the selected vehicle so that a horn or lamp of the selected vehicle operates.

The processor 870 may transmit a control signal to the selected vehicle through the first communication unit 860 based on the called key fob data.

The selected vehicle may be referred to as a vehicle for entering.

FIG. 14B is a diagram illustrating flashing operation according to an implementation.

Referring to FIG. 14B, the processor 870 may additionally store key fob data of a vehicle in the memory 840. Such operation may be referred to as flashing operation.

For example, the processor 870 may additionally store key fob data of a vehicle based on a user input received through the input unit 810.

For example, the processor 870 may additionally store key fob data of a vehicle based on a push message received through the second communication unit 825.

When the flashing operation is performed in the smart key 800, key information corresponding to the key fob data stored in the smart key 800 may be updated in a key box of the vehicle 100.

In some implementations, when additional key fob data is stored, pre-stored key fob data may be deleted.

The present disclosure as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A smart key configured to control a plurality of vehicles comprising a first vehicle and a second vehicle, the smart key comprising:
a first communication unit configured to exchange information with the plurality of vehicles;
an information acquisition device configured to acquire user information associated with a user of the smart key;
at least one processor; and
at least one computer memory coupled to the at least one processor and having stored thereon instructions which, when executed by the at least one processor, causes the at least one processor to perform operations comprising:
based on the user information, selecting, as a vehicle to enter, at least one vehicle among the plurality of vehicles based on the user information and based on information associated with the plurality of vehicles;
exchanging, through the first communication unit, a signal with the selected at least one vehicle, and
simultaneously transmitting, through the first communication unit, a first signal configured to control the first vehicle and a second signal configured to control the second vehicle.

2. The smart key according to claim 1, wherein the information acquisition device comprises at least one of:
an input unit configured to receive a user input;
a sensor configured to sense biometric information of the user; or
a second communication unit configured to wirelessly receive the user information from an external device.

3. The smart key according to claim 1, wherein the user information comprises at least one of authentication information associated with the user, destination information associated with the user, preferred vehicle information associated with the user, driving record information associated with the user, physical information associated with the user, or location information associated with the user.

4. The smart key according to claim 3, wherein the information associated with the plurality of vehicles comprises at least one of, for each of the plurality of the vehicles, location information, energy reserve information, mileage information, fuel economy information, function information, or vehicle type information.

5. The smart key according to claim 1, further comprising an output unit,
wherein the operations comprise:
outputting, through the output unit, information associated with the selected at least one vehicle.

6. The smart key according to claim 5, wherein the operations comprise:
outputting, through the output unit, route information associated with a walking route between a location of the user and a location of the selected at least one vehicle.

7. The smart key according to claim 1, wherein the operations comprise:

based on the user information, determining a level of control authority associated with the user in controlling the selected at least one vehicle; and transmitting, through the first communication unit, the determined level of control authority to the selected at least one vehicle.

8. The smart key according to claim 7, wherein determining the level of control authority comprises determining at least one of a maximum driving speed, a maximum driving distance, a maximum distance from a reference location, a maximum driving time, permitted timeslot, or a permitted road.

9. The smart key according to claim 1,
wherein the information acquisition device is further configured to acquire first key fob data associated with one of the plurality of vehicles, and
wherein the operations comprise:
acquiring, through the information acquisition device, the first key fob data associated with one of the plurality of vehicles; and
storing, in the at least one memory, the first key fob data associated with one of the plurality of vehicles.

10. The smart key according to claim 9, wherein the first key fob data is stored as a portion of a firmware of the smart key.

11. The smart key according to claim 10, wherein storing the first key fob data comprises:
overwriting a second key fob data associated with another one of the plurality of vehicles with the first key fob data by flashing at least part of the at least one memory.

12. The smart key according to claim 10, wherein a plurality of key fob data associated with the plurality of vehicles are stored in different regions of the firmware, the different regions each being dedicated for each of the plurality of vehicles.

13. The smart key according to claim 1, further comprising a second communication unit configured to exchange data with a mobile terminal,
wherein the operations comprise:
transmitting, through the second communication unit, key fob data associated with the selected at least one vehicle to the mobile terminal.

14. The smart key according to claim 13, wherein the operations comprise:
acquiring, through the second communication unit, a first location associated with the mobile terminal and a second location associated with the selected at least one vehicle;

determining that a distance between the first location and the second location is less than or equal to a reference distance; and based on the determination that the distance between the first location and the second location is less than or equal to the reference distance, transmitting the key fob data to the mobile terminal.

15. The smart key according to claim 13, wherein the operations comprise:
based on the user information, determining a level of control authority associated with the user in controlling the selected at least one vehicle; and
transmitting, through the second communication unit, the determined level of control authority to the mobile terminal.

16. The smart key according to claim 15, wherein the operations comprise:
determining that the mobile terminal is located inside of the selected at least one vehicle; and
based on the determination that the mobile terminal is located inside of the selected at least one vehicle, receiving, through the second communication unit, driving situation information associated with the selected at least one vehicle.

17. The smart key according to claim 1, wherein the second signal is configured to control the second vehicle to follow the first vehicle.

18. The smart key according to claim 1, wherein the operations comprise:
determining that a distance to the selected at least one vehicle is less than or equal to a reference distance; and
based on the determination that the distance to the selected at least one vehicle is less than or equal to the reference distance, transmitting, through the first communication unit, a control signal to the selected at least one vehicle.

19. The smart key according to claim 1, wherein the operations comprise:
transmitting, through the first communication unit, a control signal to the selected at least one vehicle configured to set one or more vehicle settings based on the user information.

20. A system comprising:
the smart key according to claim 1; and
the plurality of vehicles.

* * * * *